US012808430B2

(12) United States Patent
Sandberg et al.

(10) Patent No.: US 12,808,430 B2
(45) Date of Patent: Nov. 24, 2026

(54) SHAFT SPEED REDUCERS AND RELATED METHODS

(71) Applicant: Ye Olde Robotics Company LLC, San Francisco, CA (US)

(72) Inventors: Roy Benjamin Sandberg, San Francisco, CA (US); Dan Sandberg, Stockholm (SE)

(73) Assignee: Ye Olde Robotics Comapny LLC, San Francisco, CA (US)

( * ) Notice: Subject to any disclaimer, the term of this patent is extended or adjusted under 35 U.S.C. 154(b) by 0 days.

(21) Appl. No.: 19/300,015

(22) Filed: Aug. 14, 2025

(65) Prior Publication Data

US 2025/0369502 A1 Dec. 4, 2025

Related U.S. Application Data

(63) Continuation-in-part of application No. PCT/US2024/015655, filed on Feb. 13, 2024.

(60) Provisional application No. 63/485,654, filed on Feb. 17, 2023.

(51) Int. Cl.
*F16H 23/00* (2006.01)
*F16H 1/32* (2006.01)

(52) U.S. Cl.
CPC ............ *F16H 23/00* (2013.01); *F16H 1/321* (2013.01); *F16H 2710/24* (2013.01)

(58) Field of Classification Search
CPC ........... F16H 23/00; F16H 23/04; F16H 1/321
See application file for complete search history.

(56) References Cited

U.S. PATENT DOCUMENTS 4,117,746 A 10/1978 Pierrat
4,563,915 A 1/1986 Tibbals, Jr.
4,620,456 A * 11/1986 Distin .................... F16H 1/321 475/168
7,545,067 B2 6/2009 Drexlmaier
9,712,025 B2 7/2017 Hasegawa et al.
9,774,229 B1 9/2017 Mergener et al.
(Continued)

FOREIGN PATENT DOCUMENTS

JP 4617130 B2 * 1/2011
WO 2021085647 A2 5/2021
(Continued)

OTHER PUBLICATIONS

JP4617130B2 (Year: 2011).*
(Continued)

*Primary Examiner* — Derek D Knight
(74) *Attorney, Agent, or Firm* — Law Office of Paul B. Johnson; Paul B. Johnson

(57) ABSTRACT

A nutating cam shaft speed reducer includes multiple cams and rolling or sliding surfaces to create a high reduction ratio, high torque speed reducer in a small space. The nutating cam speed reducer may be made predominantly from plastic. The nutating cam speed reducer may be made to work in concert with a motor, wherein the motor is also made using a high percentage of plastic. The motor may feature an integrated control printed circuit board. The nutating cam speed reducer and motor may be integrated into a robot arm, and the robot arm may be centrally cooled using a technique wherein airflow is routed through an axial center of the robot arm and back out along a perimeter of the robot arm. The airflow cools power electronics, the nutating cam speed reducer, and a motor stator such that higher power levels are possible than without active cooling.

2 Claims, 22 Drawing Sheets

(56) References Cited

U.S. PATENT DOCUMENTS

| | | | | |
|---|---|---|---|---|
| 11,841,072 | B2 * | 12/2023 | Shuai | F16H 55/17 |
| 2007/0232856 | A1 | 10/2007 | Ueno et al. | |
| 2011/0092332 | A1 | 4/2011 | Evenson | |
| 2016/0329795 | A1 | 11/2016 | Ricci et al. | |
| 2017/0179803 | A1 | 6/2017 | Li et al. | |
| 2020/0112227 | A1 | 4/2020 | Kouda et al. | |
| 2020/0204049 | A1 | 6/2020 | Zhong et al. | |
| 2020/0313481 | A1 | 10/2020 | Patel et al. | |
| 2021/0211011 | A1 | 7/2021 | Liao | |
| 2025/0015654 | A1 | 1/2025 | Sandberg et al. | |

FOREIGN PATENT DOCUMENTS

| | | | |
|---|---|---|---|
| WO | 2023192300 | A2 | 10/2023 |
| WO | 2024173441 | A2 | 8/2024 |

OTHER PUBLICATIONS

"A jerk-constrained asymmetric motion profile for high-speed motion stages to reduce residual vibration" by Huaizhong Li, published online Feb. 1, 2016 in International Journal of Computer Applications in Technology, vol. 53, No. 2.

"Secondary Operations: Heat Staking," published online by the B.E.C. Group at https://www.becgroup.com/news/spotlight-on-secondary-operations-heat-staking/ at least as early as Sep. 26, 2021.

International Search Report for PCT/US23/16598, mailed Aug. 30, 2023.

Written Opinion of the International Searching Authority for PCT/US23/16598, mailed Aug. 30, 2023.

International Search Report for PCT/US24/15655, mailed Jul. 24, 2024.

Written Opinion of the International Searching Authority for PCT/US24/15655, mailed Jul. 24, 2024.

"Nutating Mechanical Transmission (Maroth Drive Principle)," published Jan. 1974 by Boeing Vertol Company.

"Constant-velocity joint," published by Wikipedia Feb. 16, 2023, available online at https://en.wikipedia.org/w/index.php?title=Constant-velocity_joint&oldid=1139691385, retrieved and last visited Aug. 14, 2025.

"Introduction to Pericyclic Transmissions," Dr. Hermann J. Stadtfeld, Gear Technology Mar./Apr. 2021 publication, p. 40-46.

* cited by examiner

500

```
function calculateCamPoint (angleAlongBevelPerimeter, bevelAngle,
lobeAmplitude, lobeCount, radius)
{
// point along spherical coordinate system line of latitude
501 → var point = cartesianVectorFromPolar (radius, 90*degree-bevelAngle,
angleAlongBevelPerimeter);
// rotation axis
502 → var yAxisLine = line(vector(0, 0, 0) *  meter, Y_DIRECTION);
// create rotation matrix
503 → var pipRotation = rotationAround(yAxisLine, -lobeAmplitude);
// rotate the point
504 → var rotatedPoint = pipRotation * point;
// Define plane to project onto
505 → var xyPlane = plane(Vector(0*meter, 0*meter, 0*meter),
Z_DIRECTION);
// Calculate projection
506 → var projectectedpoint = project(xyPlane, rotatedPoint) ;
// distance to projected point from origin
507 → var distanceToProjectedPoint = sqrt(projectedPoint [0]^2 +
projectedpoint[1]^2);
//determine angle on projection plane
508 → var angleToProjectedPoint = angleBetween(-X_DIRECTION,
projectedPoint, Z_DIRECTION);
//angle along line of latitude before compensation
509 → var startingAngle = (180*degree+angleAlongBevelperimeter);
//difference between angle of starting point and angle of
projected point
511 → var diffAngle = ((-180*degree+angleToProjectedPoint)-
angleAlongBevelPerimeter);
//divide angle by lobeCount and add projection difference
512 → var scaledAngleForLobePlane = startingAngle/lobeCount + diffAngle;
//convert to cartesian coorrdinate in global reference frame
513 → var scaledpoint = vector(distanceToProjectedPoint*sin
(scaledAngleForLobePlane), distanceToProjectedPoint*cos
(scaledAngleForLobePlane), rotatedPoint[2]);
514 → return scaledpoint;
}
```

FIG. 5

$$\frac{\omega_{in}}{\omega_{out}} = \frac{1}{\left(1 - \frac{N1}{N2} * \frac{N3}{N4}\right)}$$

609

SHAFT SPEED REDUCERS AND RELATED METHODS

CROSS REFERENCE TO RELATED APPLICATIONS

This document is a bypass continuation-in-part application of PCT App. No. PCT/US24/15655, entitled "Shaft Speed Reducers and Related Methods," naming as first inventor Roy Sandberg, which was filed on Feb. 13, 2024, which in turn claims the benefit of the filing date of U.S. Provisional Patent Application No. 63/485,654, entitled "Nutating Cam Speed Reducer With Distributed Rolling Contact And Zero Backlash," naming as first inventor Roy Sandberg, which was filed on Feb. 17, 2023, the disclosures of each of which are hereby incorporated entirely herein by reference.

BACKGROUND

1. Technical Field

The present invention relates to nutating cam speed reducers and methods, more specifically, to a low cost, zero backlash, high torque capacity speed reducer suitable for robotics and automation.

2. Background Art

Industrial robots and industrial automation often require high torque and high accuracy motion. As electric motors tend to be limited in torque but are able to rotate quite fast, often a gear reduction is used to provide the appropriate torque and speed. However the need for accuracy coupled with high torque limits the number of gear reducers that are suitable.

In particular, cycloidal drives and harmonic drives tend to be utilized because they can be designed to produce little to no backlash and can handle reasonably high loads. However, they can be quite expensive as their production process requires high tolerances.

Accordingly, there is a need for a gear reduction scheme that can handle high torque with little to no backlash, but without a need for expensive production processes. The present disclosure solves these and other problems.

This background information is provided to reveal information believed by the applicant to be of possible relevance to the present invention. No admission is necessarily intended, nor should it be construed, that any of the preceding information constitutes prior art against the present invention.

SUMMARY

In some aspects, the techniques described herein relate to a speed reducer including: an input plate; a plurality of first surfaces coupled with the input plate; a wobble cam including a front face having multiple lobes interfacing with the first surfaces, the wobble cam also including a back face having multiple lobes; a plurality of second surfaces interfacing with the back face; and an output plate coupled with the plurality of second surfaces.

In some aspects, the techniques described herein relate to a speed reducer, wherein the front face and the back face are in rolling contact or sliding contact with the first surfaces and second surfaces, respectively.

In some aspects, the techniques described herein relate to a speed reducer, wherein the wobble cam nutates during operation of the speed reducer.

In some aspects, the techniques described herein relate to a speed reducer, wherein a total number of lobes on the front face is offset by one relative to a total number of first surfaces.

In some aspects, the techniques described herein relate to a speed reducer, wherein a total number of lobes on the back face is offset by one relative to a total number of second surfaces.

In some aspects, the techniques described herein relate to a speed reducer, wherein one of the front face and the back face includes a sinusoidal shape.

In some aspects, the techniques described herein relate to a speed reducer, wherein the wobble cam forms a ring shape having a hollow center.

In some aspects, the techniques described herein relate to a speed reducer including: a plurality of first surfaces; and a wobble cam forming a ring having a hollow center, the wobble cam including a front face having a substantially sinusoidal shape and interfacing with the first surfaces; wherein the wobble cam nutates during operation of the speed reducer.

In some aspects, the techniques described herein relate to a speed reducer, wherein the front face is in rolling contact or sliding contact with the first surfaces.

In some aspects, the techniques described herein relate to a speed reducer, wherein a total number of lobes on the front face is offset by one relative to a total number of first surfaces.

In some aspects, the techniques described herein relate to a speed reducer, further including a plurality of second surfaces, the wobble cam further having a back face having a substantially sinusoidal shape and interfacing with the second surfaces, wherein the back face is in rolling contact or sliding contact with the second surfaces.

In some aspects, the techniques described herein relate to a speed reducer, wherein a total number of lobes on the back face is offset by one relative to a total number of second surfaces.

In some aspects, the techniques described herein relate to a speed reducer, further including an axle coupled with the wobble cam.

In some aspects, the techniques described herein relate to a speed reducer, further including a motor coupled with the axle.

In some aspects, the techniques described herein relate to a speed reducer, further including an exterior tube at least partially enclosing the motor, axle, and wobble cam.

In some aspects, the techniques described herein relate to a speed reducer system, including: a plurality of first surfaces and second surfaces; a wobble cam including a front face having multiple recesses interfacing with the first surfaces, the wobble cam also having a back face having multiple recesses interfacing with the second surfaces, wherein the wobble cam nutates during rotation; and a first axle coupled with the wobble cam and configured to rotate the wobble cam.

In some aspects, the techniques described herein relate to a system, further including: a first sensor configured to measure an angle or position of a first component of the speed reducer system; and a second sensor configured to measure an angle or position of a second component of the speed reducer system; wherein the system is configured to: calculate strain using the measurements of the first sensor and the second sensor, said calculated strain corresponding with a torque; and use the torque as an input for controlling the system.

In some aspects, the techniques described herein relate to a system, wherein the calculated strain pertains to a strain of one or more of: the first axle; the wobble cam; a rotor of the speed reducer system; a stationary gear of the speed reducer system; and an output gear of the speed reducer system.

In some aspects, the techniques described herein relate to a system, further including: a motor coupled with the first axle; a load-bearing exterior tube, at least partially enveloping the motor, the first axle, and the wobble cam; and a bearing retainer coupled with the exterior tube and rotatingly coupled with the first axle.

In some aspects, the techniques described herein relate to a system, wherein the first axle passes through a hollow center of the wobble cam, wherein the first axle is coupled with the wobble cam through at least one bearing assembly, and wherein the first axle is angularly offset, relative to its rotational axis, where it passes through the hollow center of the wobble cam.

General details of the above-described implementations, and other implementations, are given below in the DESCRIPTION, the DRAWINGS, the CLAIMS and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

FIG. 5 representatively illustrates example script that may be used to generate a single lobe of the wobble cam of FIG. 4G;

DESCRIPTION

Figure 1:
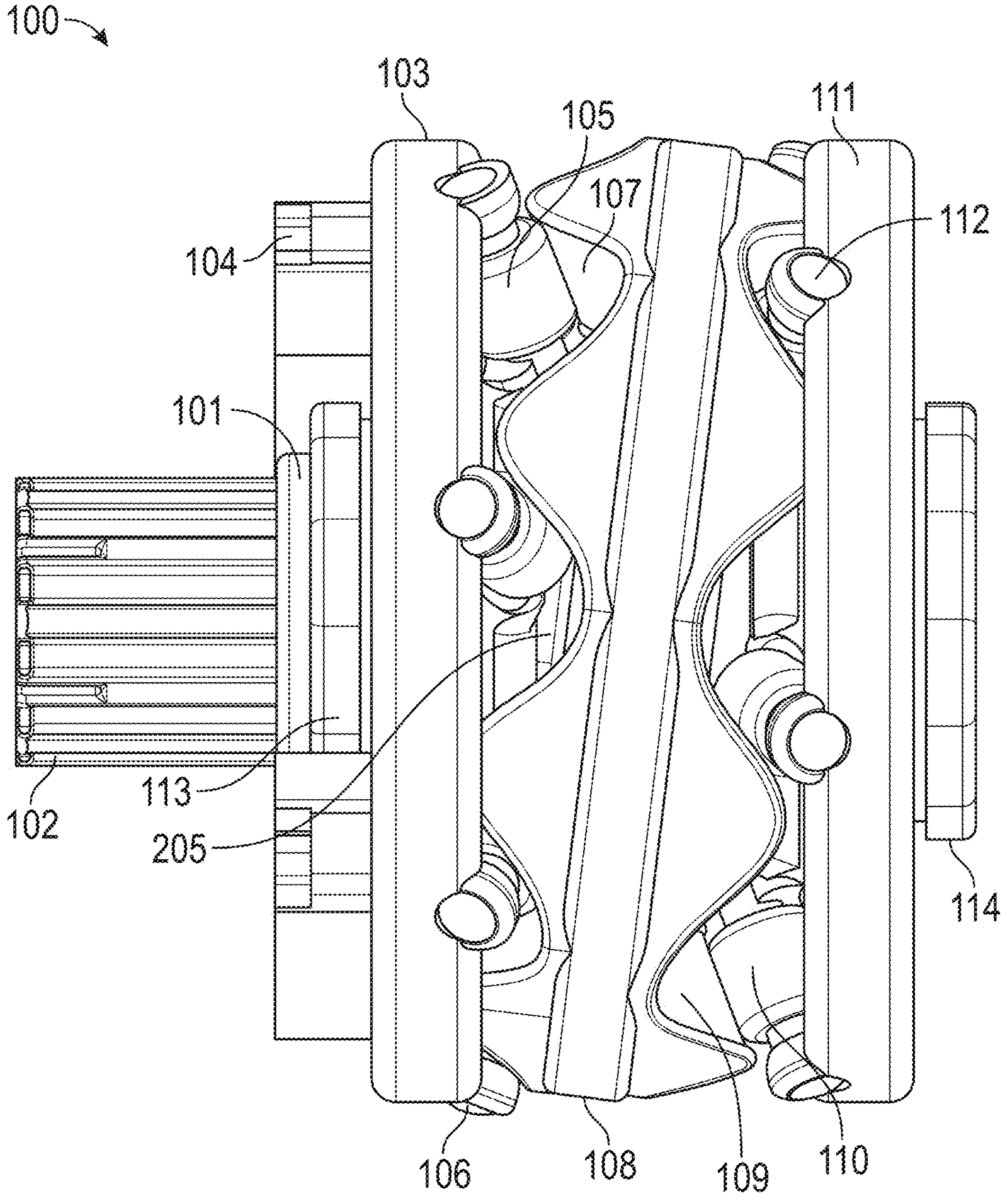
FIG. 1 is a front view of an implementation of a nutating cam shaft speed reducer.

Implementations/embodiments disclosed herein (including those not expressly discussed in detail) are not limited to the particular components or procedures described herein. Additional or alternative components, assembly procedures, and/or methods of use consistent with the intended shaft speed reducers and related methods may be utilized in any implementation. This may include any materials, components, sub-components, methods, sub-methods, steps, and so forth.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.)

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure, and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled," "attached," "connected," and/or "joined" are used to indicate either a direct connection between two components or, where appropriate, an indirect connection to one another through intervening or intermediate components. In contrast, when a component is referred to as being "directly coupled," "directly attached," "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements has been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and/or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within the embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

As previously discussed, there is a need for a gear reduction scheme that can handle high torque with little to no backlash, but without a need for expensive production processes. The present disclosure solves these and other problems.

FIG. 1 is a front view of an implementation of a cam-based shaft speed reducer 100 (hereinafter also called a "speed reducer," "shaft speed reducer," "nutating cam reducer," "nutating cam speed reducer," "cam-based speed reducer," and so forth). An input shaft 101 includes a spline connector 102 for attachment to a rotational input source, for example, an electric motor. A stationary input plate 103 includes attachment points 104 for a motor bolt pattern. The input plate also houses an arrangement of roller bearings 105 (also hereinafter called "rollers" or "bearings") rotationally attached via input side pins 106. In the preferred embodiment these roller bearings are HK0509 drawn cup needle roller bearings, although it should be understood that other bearings or rollers may be used depending on the size and load requirements of the speed reducer. In an alternative embodiment of the invention, the roller bearings are conically shaped rather than cylindrically shaped. It should be understood that using a conically shaped bearing with a terminus at the origin of the rollers' center lines and the cam center lines will more closely approximate pure rolling motion. The roller bearings 105 are in direct contact with a front face 107 of a wobble cam 108 (which may also be called a wobble gear, as with all other wobble cams herein) that nutates around the rotating input shaft. The wobble cam also has a back face 109 that is in direct contact with roller bearings 110 (also hereinafter called "rollers" or "bearings") at least partially housed by output plate 111. The roller bearings are rotationally attached via output side pins 112. The input shaft is retained via a threaded front retainer 113 and a threaded rear retainer 114. These threaded retainers press against ball bearings, not shown, and allow the input shaft to rotate freely with respect to the stationary input plate and the output plate.

This arrangement allows the output plate to rotate with respect to the stationary input plate, with a speed reduction that will be explained in subsequent sections. The use of roller bearings that are in constant rotational contact with the wobble cam ensures that the system has low resistance to rotation, and therefore high efficiency, owing to the predominantly rolling (rather than sliding) motion of the rollers. As all rollers bear some of the load, and the cams and rollers are near the outer perimeter of the speed reducer, leverage is increased and/or maximized and high load capacity is provided. As the threaded retainers can compress the assembly to an arbitrary degree, zero backlash can be created by adjusting the degree of compression. The resulting speed reducer 100 thereby enjoys high efficiency, high load capacity, and zero backlash.

In some embodiments of the invention, the wobble cam doubles as a bearing surface, so that the total bearing count is reduced.

In the preferred embodiment, the wobble cam is made of PA12 (Nylon 12) plastic, although it should be understood that the wobble cam as well as the other components may be made of various plastics, ceramics, composites, metals, or other materials as known in the art. The plastic cams themselves offer (or have) a lower modulus of elasticity than metals, generally, which allows the front cam face 107 and rear cam face 109 to deform more than metal, allowing greater load sharing between the multiple cams and rollers in mesh. It should be understood that roller bearings provide line contact rather than point contact (as a sphere would), and are therefore able to sustain greater loads without excess deformation of the rollers or the wobble cam. Plastic also allows dry lubrication, eliminating the need for liquid lubricants and associated ongoing servicing of the cams. Finally, plastic provides for a lower-cost system with a lower total weight.

While this version of the invention does not illustrate integration with a drive motor, it should be understood that an integrated cam and motor is envisioned. Additionally, integration with an encoder is also envisioned. In particular, since the cams are plastic and do not require liquid lubrication, the delicate electronics typically used for motors, motor drivers, and relative or absolute encoders (whether they include optical, capacitive, magnetic, or other encoder technologies known in the art), can coexist in the same enclosure with the cams, thereby eliminating the need for an additional enclosure.

Figure 2:
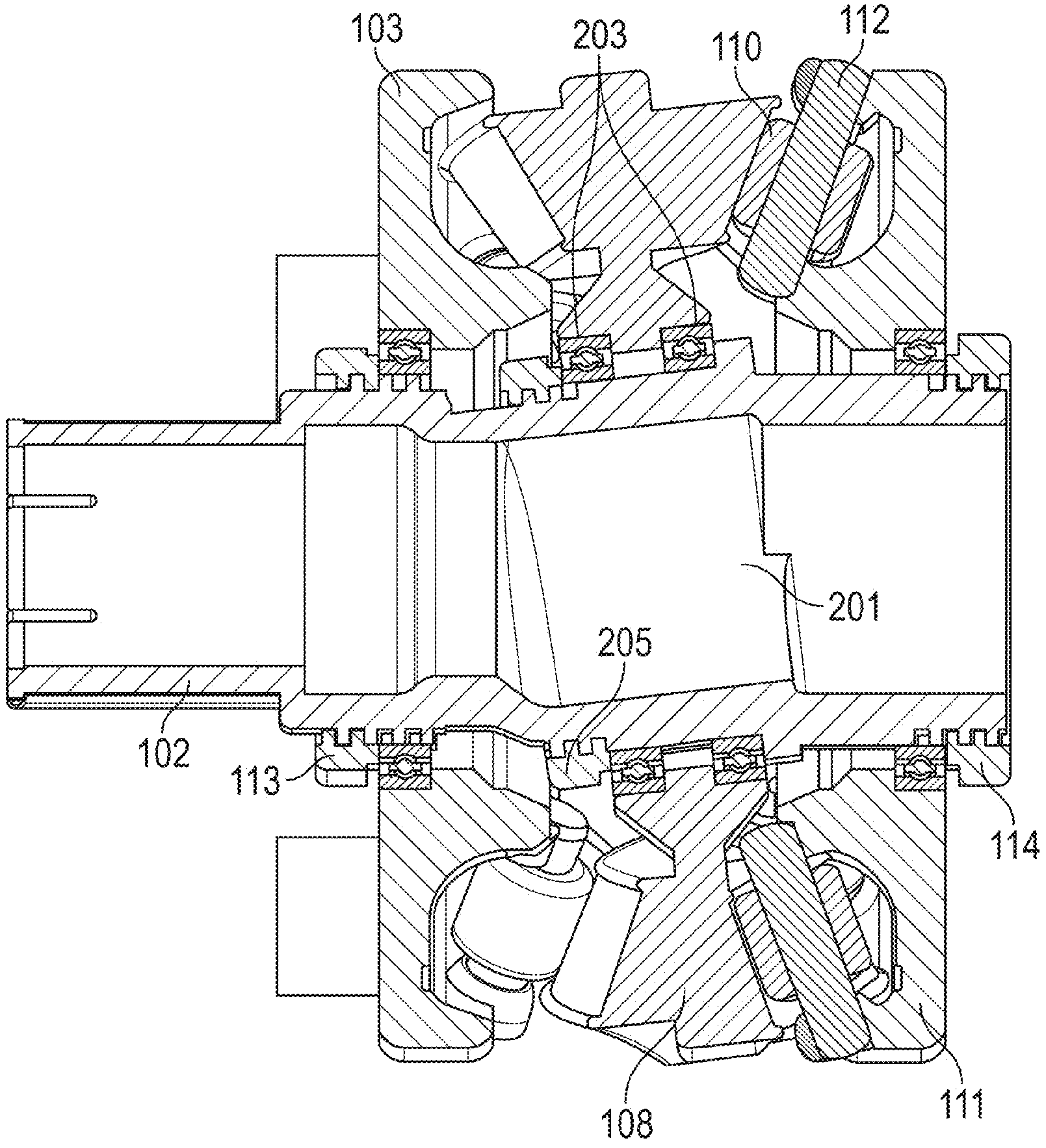
FIG. 2 is a front cross-section view of the shaft speed reducer of FIG. 1.

FIG. 2 illustrates a front cross-section view of the cam-based shaft speed reducer of FIG. 1. From this perspective, the angularly eccentric central axis 201 of the input shaft 101 becomes visible. The angle of eccentricity is set to match the lobe amplitude angle of the wobble cam (seven degrees in the preferred embodiment, although other lobe angles may be used), as further described herein with respect to FIG. 5.

It can be seen that a pair of bearings 203 are used to rotationally constrain the wobble cam 108. In the preferred embodiment, 6706 thin section metric bearings are used, although it should be understood that other bearings may be selected depending on the load and size requirements of the speed reducer. The bearings are held in place via threaded retainer 205 which threads onto the input shaft from the input face side. It should be understood that other bearing retention schemes known in the art may also be used, such as clip rings. The means of attaching the pins 106 and pins 112 to secure the roller bearings 105 and roller bearings 110 can also be seen—the pins are inserted from the outside diameter towards the center. In an alternative embodiment the pins may also be snapped into place using a snap-lock, either from the outside diameter towards the center, or by pressing down in a direction parallel to the center line of the input face. The action of the front retainer 113 and rear retainer 114 to compress the axial stack of components comprising the stationary input plate 103 (front plate), the wobble cam 108, and the output plate 111 (rear plate) is also illustrated. It can be seen that backlash is eliminated when these retainers are tightened. In this way, systemic tolerances can be adjusted owing to the substantially axial stack up of the wobble cam, the front plate, and the rear plate. The threaded retainers also provide a means of compressing the axial stack of components to an arbitrary degree of pre-load when desired. The low friction due to the substantially rolling rather than sliding resistance between the wobble cam and the rollers, plus the adjustable tolerance, allows for a zero-backlash design. While the design provides an efficient gear reducer, the opposing arrangement of the front and rear cam faces prevents them from being back-driven from the output shaft, as the nutating motion of the wobble cam results in the cam profiles pushing in opposite directions when back-driven. This advantageously eliminates the need for a motor brake in certain applications. It should be noted that the single-sided design (see FIGS. 13A-13C) is back-drivable.

Figure 3:
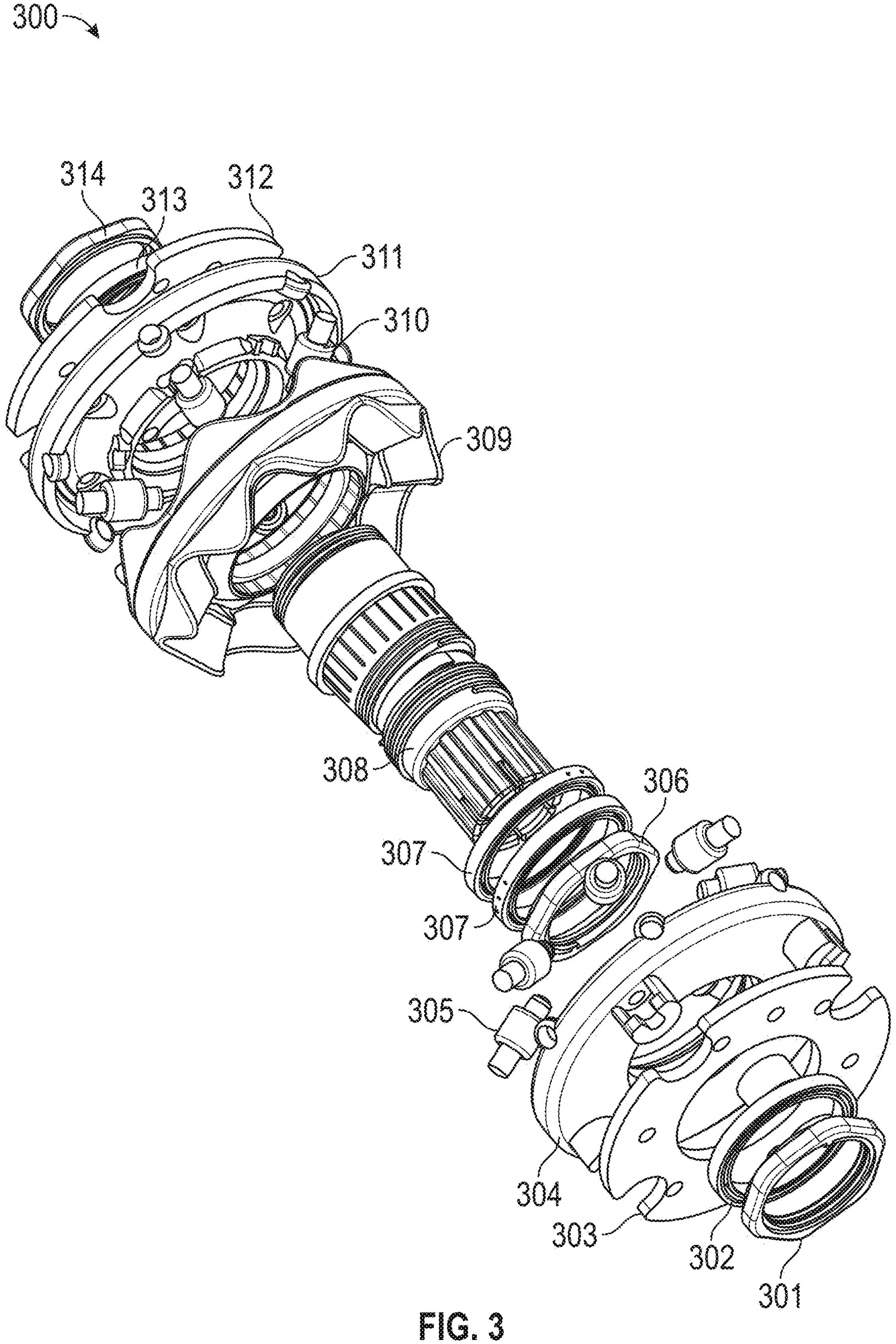
FIG. 3 illustrates a front, bottom, exploded view of another implementation of a nutating cam shaft speed reducer.

FIG. 3 illustrates an exploded view of another implementation of a nutating cam-based shaft speed reducer 300 (hereinafter also called a "speed reducer," "shaft speed reducer," "nutating cam reducer," "nutating cam speed reducer," "cam-based speed reducer," and so forth). The exploded view of the cam-based speed reducer illustrates the relative placement of the components. The locations of the bearings and how they are constrained by the threaded retainers is again shown. Speed reducer 300 differs from speed reducer 100 at least in part due to a front end plate 303 and rear end plate 312. These are used to provide structural rigidity to the assembly when the modulus of elasticity of the rest of the assembly (or other components of the assembly) is insufficient to rigidly constrain the rollers from buckling outwards under load. It should be understood that the front and rear end plates may be fabricated from metal, composite materials, or other materials known in the art to have a high elastic modulus.

The front and rear end plates may be attached by screws, adhesive, or other bonding and attachment means known to a person of ordinary skill in the art. Via this method, three-dimensional (3D) printed or injection-molded polymer/plastic may be used for the front and rear plates and the wobble cam, while still enabling a high load capacity for the system, and without requiring expensive machined metal components.

Similar to speed reducer 100, the central axle 308 rotates with two rotationally connecting bearings 307 constraining the motion of a wobble cam 309 to nutating motion. A bearing locking nut 306 locks the bearings in position on the axle. The axle is rotationally affixed using a front bearing 302, and a rear bearing 313. Bearing locking nut 301 and bearing locking nut 314 rotationally affix the bearings on the axle. The wobble cam remains in contact with a series of front roller bearings 305 (also hereinafter called "rollers" or "bearings") and rear roller bearings 310 (also hereinafter called "rollers" or "bearings") mounted by pins onto a front bearing plate 304 and a rear bearing plate 311. The lobes of the cam are thereby free to roll against the roller bearings, and the rotation of the rear bearing plate relative to the front bearing plate is reduced in rotational speed relative to the axle by a ratio that will be described hereafter with respect to FIGS. 6A-6B.

Figure 4A:
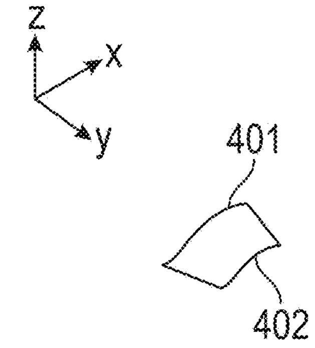
FIG. 4A representatively illustrates an example step that may be used for sinusoidal cam generation.
Figure 4B:
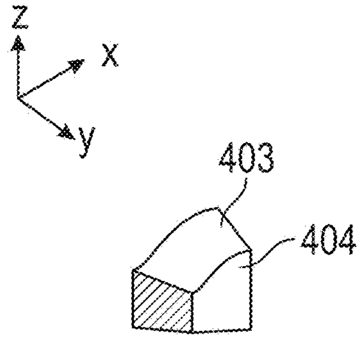
FIG. 4B representatively illustrates an example step that may be used for sinusoidal cam generation.
Figure 4C:
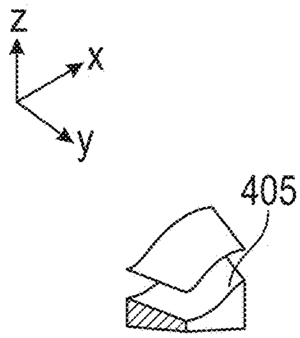
FIG. 4C representatively illustrates an example step that may be used for sinusoidal cam generation.
Figure 4D:
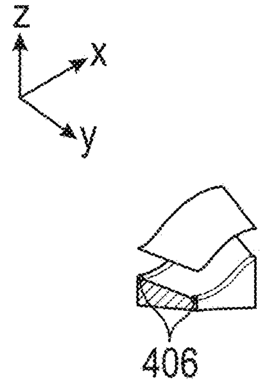
FIG. 4D representatively illustrates an example step that may be used for sinusoidal cam generation.
Figure 4E:
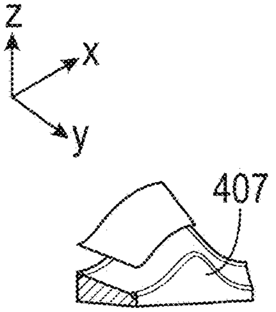
FIG. 4E representatively illustrates an example step that may be used for sinusoidal cam generation.
Figure 4F:
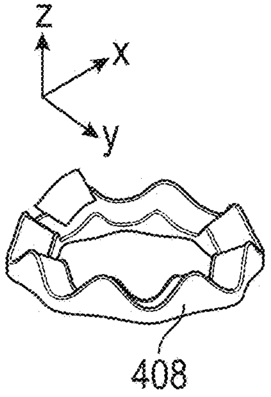
FIG. 4F representatively illustrates an example step that may be used for sinusoidal cam generation.
Figure 4G:
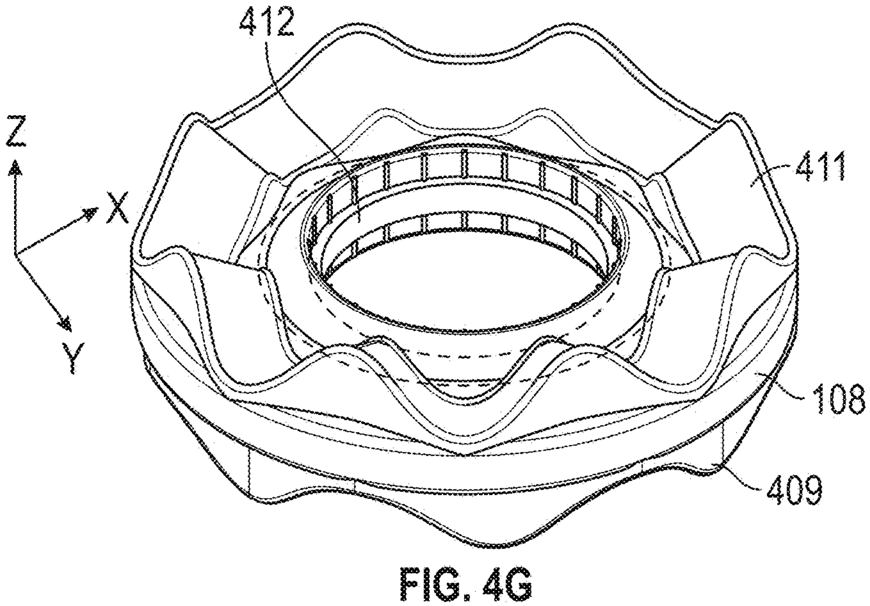
FIG. 4G is a top, front view of a wobble cam of the speed reducer of FIG. 1, which may be formed using the steps representatively illustrated in FIGS. 4A-4F.

FIGS. 4A-4F representatively illustrate example steps that may be used for sinusoidal cam generation (for example to form the wobble cam of FIG. 4G).

Structurally, the wobble cam is designed to be in simultaneous rolling contact with all of the rollers on both faces. This creates a very rigid structure that can handle a lot of torque while also minimizing friction, and eliminating backlash.

In implementations the cam profile is a modified spherical sinusoid. In a polar coordinate system, a spherical sinusoid is defined by the parametric equations: $\{r=a, \tan \lambda=k \cos n\theta\}$, where a is the spherical longitude of the plot, k is the amplitude of the sinusoidal wave, and n is the period. It should be understood that this method of creating cam lobes differs from traditional means of designing gears such as involute, cycloidal, or circular arc gearing. Owing to the continuous curvature of the cam profile, without sharp edges, inner angles, or sharp slope transitions (i.e., with a continuous first order derivative) the cam profile is also easy to machine using techniques such as computer numerical control (CNC) milling or even laser tube cutting. It can be seen that a CNC milling bit with a diameter at least as large as the roller bearing could be used to mill the face of the cams. It is also possible to 3D-print or injection-mold the cam profiles.

Some specifics of generating a single lobe will be described with reference to FIGS. 4-5. A first multi-lobe cam profile 409 and a second multi-lobe cam profile 411 may be formed, each configured to interface with a different set of rollers (and each having the shape of the complete conical cam section 408, described hereafter). Using computer-aided design (CAD) software techniques known to a person of ordinary skill in the art, only a single 180-degree portion of the lobe 404 needs to be generated, which may then be mirrored to create a single complete 360-degree lobe 407, and this lobe may be circularly patterned (since each cam profile is radially symmetric) to create the number of needed lobes for one complete conical cam section 408. A single 180-degree portion of the lobe may be created by generating a spline 401 with the proper mathematical properties, and also creating spline 402 which is a scaled-down copy of spline 401 (scaled towards the origin of the polar coordinate system). By lofting between those two splines, a surface 403 is created. That surface may be extended towards the plane containing the origin to create the half-lobe 404.

The width of the rollers may be compensated for when generating the cam, and this can be done by moving the face of the half-lobe by a distance equal to the roller radius, as may be done in numerous computer aided design packages, to form a modified half-lobe 405. A line segment drawn from a roller radius length below the origin (on the z axis) will then be coincident with the moved face at every location. In an alternative embodiment, wherein the roller bearings are conically shaped rather than cylindrically shaped, the face should be moved such that a line segment drawn from the origin is coincident with the moved face at every location. One technique to accomplish this is to sweep the conical roller shape across the surface of the cam face at a height equal to the cone's central axis.

Optional guide rails 406 may also be added to the half-lobe to keep the roller restrained to a particular location along the cam. Once two complete sinusoidal cams with the desired lobe count are created in CAD software, they can be joined together with the CAD software into a single part and a central portion 412 may then be added (such that bearings can retain the sinusoidal cam against the axle) to fully model/generate wobble cam 108.

It should be understood that two cam faces, one on each face of the wobble cam, are required, and both cam faces terminate at the same cone tip, ensuring that the nutating motion occurs from a common origin. The specific number of lobes of each cam face may differ, and they may interface with a set of equidistant rollers numbering exactly one more or one less than the number of cam lobes they interact with. The equidistant roller center-lines also project to the same common conic origin.

In the preferred embodiment, the front plate has seven bearings, the front face of the wobble cam has eight cam lobes, the back face of the wobble cam has seven lobes, and the back plate has six bearings. The bearings are 9 mm in diameter and 9 mm wide. The lobe amplitudes are seven degrees, and the bevel angle is twenty degrees. It should be understood that other values may be used depending on the specific design requirements, such as reduction ratio, load capacity, wobble cam pressure angle, wobble cam height, and so forth.

"Pressure angle" is gearing nomenclature that refers to the angle between the tooth face and the gear wheel tangent. The pressure angle gives the direction normal to the tooth profile. The notion of pressure angles may be extended to the cam profiles of this invention. While involute gearing is known to have a constant pressure angle across the gear face, the cam profiles of this invention are closer to cycloidal gear faces, in that the pressure angle varies depending on the precise location along the cam profile. It should be understood that utilizing a higher number of cams while keeping the other parameters the same will result in a lower minimum pressure angle between the cam and the bearing surface (roller, pin, or other bearing surface known in the art). This is because the sinusoidal cam pattern is compressed into a smaller distance, resulting in a steeper maximum slope. Likewise, using larger diameter pins, bearings, or other bearing surfaces while keeping other parameters the same will also result in a reduced minimum pressure angle. As a smaller pressure angle is known to result in weaker teeth, but also a more efficient transmission of power (and smoother movement), control over this variable may be used by a cam designer to optimize the cam profile to the application. It should also be understood that a smaller pressure angle results in less force perpendicular to the line of action of the gear (or here, cam). This results in less stress perpendicular to the plane of rotation of the wobble gear. In embodiments with more teeth, there are typically more teeth in mesh, so while each tooth is weaker, more teeth are sharing in force transmission. Everything else being the same, that mitigates towards the use of lower pressure angles in preferred embodiments.

FIG. 5 illustrates example script that may be used to generate a single cam lobe. The 180-degree section of a single lobe is calculated iteratively, using a script that calculates each individual point, and then creates a spline fit to the set of calculated points. The cam shape for an individual lobe is calculated to match the motion of the rollers (or pins or other bearing surfaces) as they roll across the cam while the cam is both sinusoidally oscillating by a known angle and rotating by a known rate.

Simultaneous sinusoidal oscillation and rotating motion is known to trace a spherical sinusoid, which if projected onto a cylinder is a cylindrical sinusoid, which itself is a sinusoid wrapped around a cylinder. As the sinusoidal motion results in the swaying of the central axis of the cam about the axis of rotation, it can be considered a nutating motion. A spherical sinusoid can also be considered to be a special case of a Lissajous curve, also known as a Bowditch curve.

At any point in time, all roller bearings (also called "rollers" or "bearings" or "pins" or "bearing surfaces" in various embodiments of the invention) may remain in contact with the cam profile. The nutation angle results in an angular offset between the cam and the roller bearings. This distorts the motion of the rollers (which are equidistantly placed around a conical face) as seen when projected onto the plane of the cam (the circular central plane of the wobble cam, from which the lobes extend), which itself is a circle that wobbles and rotates around a central point that is also the terminus of the rollers' center-lines. The distortion owing to the circular plane's angular offset results in a cam profile that is no longer a pure spherical sinusoid from the reference frame of the circular plane. This can be understood by considering the direct projection of a circle with an angular offset relative to another planar surface. The projection onto the planar surface will assume an oval, rather than a circular, shape.

The correction can be implemented by projecting from the roller's conical face onto the plane of the cam, tracking the error between a pure sinusoid and the projected results, and multiplying the angular error by the number of lobes. It should be understood that as the projection is being done using a constant rotation velocity and nutation velocity, and as the projected cam shape rotational angle along the centerline maintains a linear relationship with the position of the projection, the projected cam shape inherently observes the law of conjugate action.

An example script used to accomplish the above is shown in FIG. 5. The script is compatible with the OnShape FeatureScript scripting language, but similar scripts written for other CAD packages or standalone computational environments will be understood to be equivalents. It should be understood that a series of points at the desired spacing should be calculated for at least 180 degrees (or half) of a single lobe, and a spline used to connect them, as would be understood by a person of ordinary skill in the art. A single point along the cam is calculated as follows.

Each point begins as a location along a line of latitude drawn in a spherical (that is to say, polar) coordinate system. Tracing through 180 degrees along this line of latitude and transforming it results in the half cam lobe profile. The bevel angle of the cam (the angle a polar coordinate system's cone makes above the equator) is the line of latitude that is traversed. Referring now to process 500 of FIG. 5, for each point, we first convert it from a polar coordinate system to a Cartesian three axis vector using script 501. The three axes are x, y, and z, where z is the axis that runs through the north and south pole of the spherical coordinate system. Within the software x, y, and z map to an array of three points (addressed as 0, 1, and 2) all implied to exist within the point variable. The algorithm first rotates the point defined in script command 501 around the y axis defined in script command 502 using a rotation matrix defined in script command 503 that rotates by an angle equal to the lobe amplitude. The lobe amplitude is the height of each cam lobe in degrees within the polar coordinate system. The result of the rotation is stored as the rotated point using script command 504. This point may then be projected onto the x-y plane using script command 505. This projected point is then stored using script command 506. The distance from the projected point to the origin (the center of the sphere) is calculated using script command 507. The angle between the x axis and the projected point on the x-y plane is then calculated using script command 508. This angle differs from the original angle along the bevel angle line of latitude (determined using script command 509) by some difference angle (determined using script command 511). The starting angle is then divided by the number of lobes to be created and the difference angle is added using script command 512. The scaled point is calculated by using this angle and the distance to the projected point from the origin to map back to a three axis Cartesian space using script command 513. The z-axis from the original rotated point (from script command 504) is reused here. The final value is returned using script command 514 and this process is repeated for each point along the bevel angle through the first 180 degrees. Any arbitrary resolution may be utilized depending on the number of points calculated, as would be understood by one of ordinary skill in the art.

As described, this code pattern can be used to create a 180-degree section of the cam, and through mirroring and circular patterning, a complete ring can be created. This ring can then be lofted to create a surface, and the surface then modified as previously described to create the cam face.

Figures 6A, 6B:
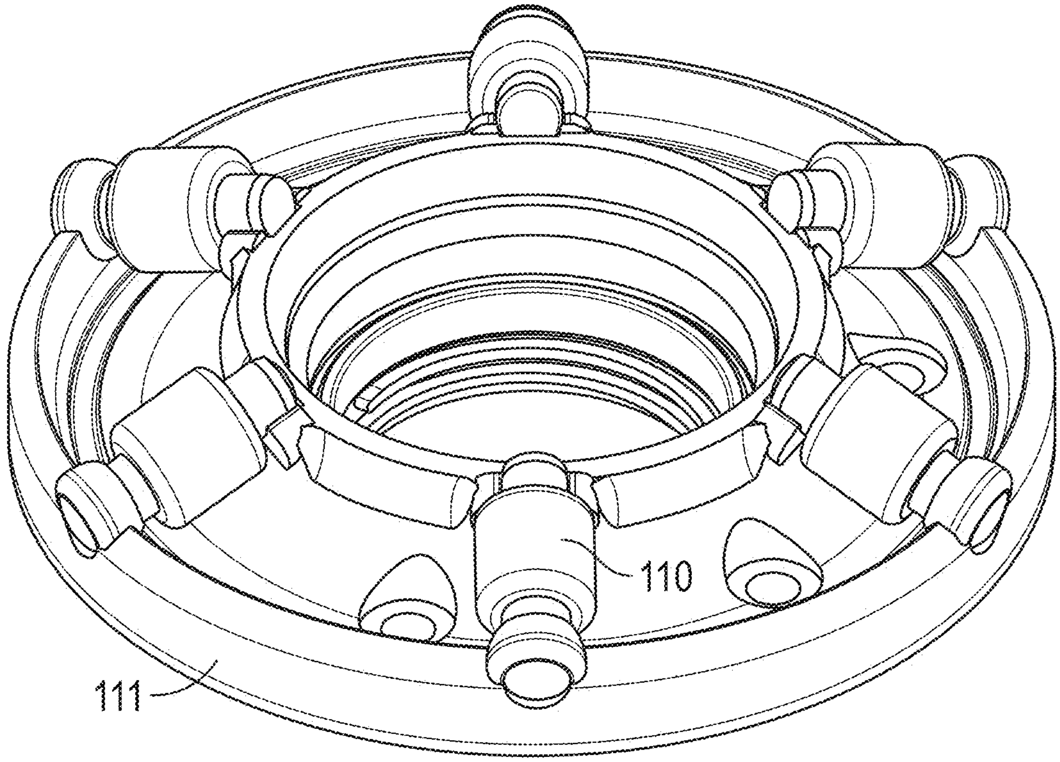
FIG. 6A is a top, front view of elements of the shaft speed reducer of FIG. 1.
FIG. 6B illustrates an example gear ratio calculation that may be used to calculate a gear ratio of a shaft speed reducer.

Each shaft speed reducer described herein may in implementations be called a Sandberg Drive. FIGS. 1-2 and 6A are useful for illustrating elements relevant to the gear ratio calculation, for a cam-based speed reducer, given in FIG. 6B. In some embodiments, the kinematics of a Sandberg Drive may be similar to those of nutation drives or pericyclic drives known in the art. As in those reduction mechanisms, one-tooth differences between meshing faces (here, between cams and rollers) interact in a complex and configurable way to produce a final drive ratio. There are four meshing faces to consider. For purposes of the equation given in FIG. 6B, an N1 face is formed by a series of radially symmetric rollers 105 that maintain continuous rolling contact against the front face 107 (input side wobble cam face), which front face is the N2 face. The back face 109 (output side wobble cam face) is the N3 face, and the N4 face is formed by a series of radially symmetric rollers 110 that maintain continuous rolling contact against the back face 109. FIG. 6A is a top, front view of some elements of speed reducer 100, showing the radial symmetry of the rollers 110 that form the N4 face and that are coupled with the output plate 111. The N2 and N3 faces are the modified sinusoidal cams that have been previously discussed.

In implementations adjacent roller faces and cam faces may differ in roller and cam count by one. In other words, the N1 face may have one more or one less roller than the N2 face has cam lobes, and the N4 face may have one more or one less roller than the N3 face has cam lobes.

With these constraints, the formula 609 $W_{in}/W_{out}=1/(1-(N1/N2)*(N3/N4))$ describes the final output reduction. For example, with 7 rollers on the input face, 8 cams on the input side wobbler, 7 cams on the output side wobbler, and 6 rollers on the output face, a gear ratio of −48 would be achieved. The negative value corresponds to a physical system where the output counter-rotates relative to the input direction.

In another embodiment of the invention, a roller count equal to the cam count is utilized on one side, and then that face does not contribute to the overall reduction, allowing for lower gear reduction levels. For example, if the input side face has seven cams and seven rollers, and the output side face has seven cams and six rollers, then an overall gear ratio of −6 would be achieved. This embodiment of the invention is backdrivable, which is useful for manual positioning (for example, of a robot arm) and force sensing of the output torque for force feedback applications.

In yet another embodiment, a single-faced wobbler gear is utilized, the wobbler prevented from rotating while being allowed to nutate through the use of any of the continuous velocity joints known in the art, such as the Rzeppa joint, the Tracta joint, the Tripod joint, and so forth. In all cases, a joint of this type allows angular motion while preventing rotation. It should be understood that the center of angular movement of the joint may coincide with the center of angular movement of the lobed cam face. This embodiment of the invention is also backdrivable.

Figure 7:
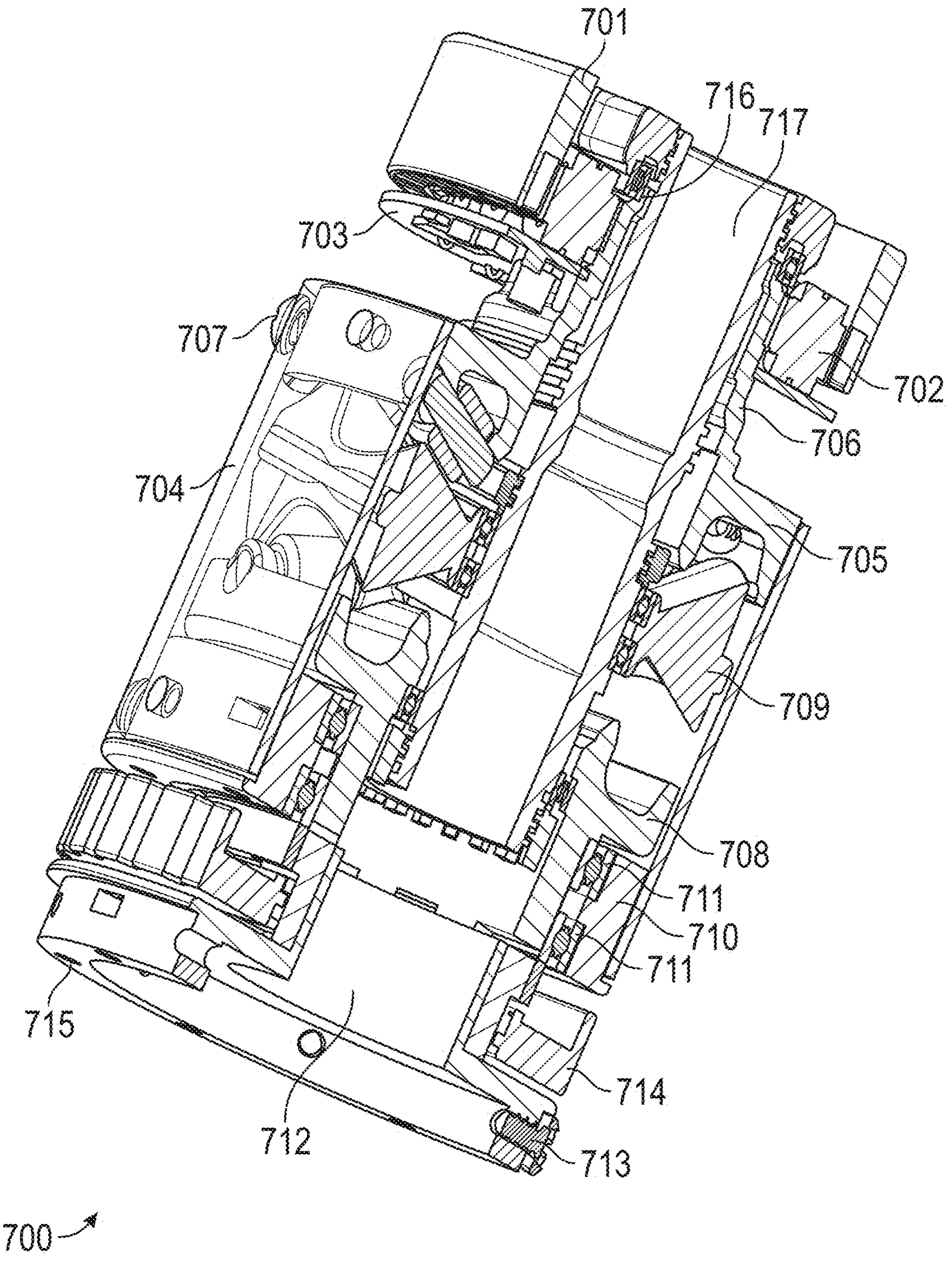
FIG. 7 is a front, side, bottom, partial see-through, cross-section view of an assembly that includes another implementation of a nutating cam shaft speed reducer integrated with a motor.

FIG. 7 illustrates a front, side, cross-section view of an assembly 700 that includes another implementation of a cam-based speed reducer integrated with a motor and shown in cross-section. The motor design described below reflects teachings given in U.S. Prov. Pat. App. No. 63/236,309, filed Mar. 31, 2022, titled "Plastic Rotor Halbach Array Motor Machine and Method of Manufacture," and in PCT App. No. PCT/US23/16598, filed Mar. 28, 2023, titled "Motors and Related Methods of Manufacture and Use" and published Oct. 5, 2023 as WO2023/192300, each of which is hereby incorporated entirely herein by reference.

As in previous embodiments of the invention, a nutating wobble cam 709 may be in rolling contact with roller bearings on an input plate 705 and an output plate 708. In said embodiments, the output plate is rotationally attached to an output bearing retainer 710 via two output ball bearing assemblies 711. The output bearing retainer is fixed to an exterior tube 704 via screws, fasteners, adhesives, or other means known in the art, and the exterior tube is also affixed to the input plate via screws 707 or other fasteners, adhesives, or other means known in the art. In this way, the exterior tube provides additional rigidity to the design. The exterior tube adds additional structural support beyond that provided by the axle 717, both of which resist the axial force of the wobble cam pressing against the rollers, while still enabling the output plate to rotate relative to the input plate. The exterior tube also resists the circumferential forces on the input plate that induce rotation of the wobble gear and output plate. In an alternative embodiment, the output plate is compressed in the direction of the input plate during assembly, and fixed in place against the exterior tube using fasteners, adhesives, or other means known in the art. Via this means, the threaded rear retainer (e.g., threaded rear retainer 114) on the central axle may be omitted, as the external tube provides the compression necessary to eliminate backlash. The output plate extends through the two output ball bearing assemblies, and connects to an output adapter 712 via a threaded connector 714 or other means known in the art. The output adapter includes a means of attaching to other objects, such as a tube or plate via radial bolts 713 (of which there may be multiple organized in a pattern) or axial face bolts 715 (of which there may be multiple organized in a pattern) or other means of attachment known in the art.

In this embodiment of the invention, the input plate includes an integrated motor tower 706 that provides a central attachment point for a motor drive and control printed circuit board (PCB) 703, a stator 702, and a rotationally connected rotor 701. A motor input bearing assembly 716 allows the rotor to rotate with respect to the stator, and thereby drive the axle 717, which in turn drives the nutating wobble cam in a nutating fashion, as in other embodiments. By this means, a motor may be integrated into the speed reducer with a minimum of additional components. It can be seen that the existing input plate is utilized to hold the PCB and stator, and the existing axle is used to hold the rotor. The motor input bearing assembly also serves to center the axle. The exterior tube may be extended over the rotor should that be desired, such that the exterior tube may be used as a structural element that also contains the entire assembly. This may be desirable in applications such as robot arms.

Figure 8:
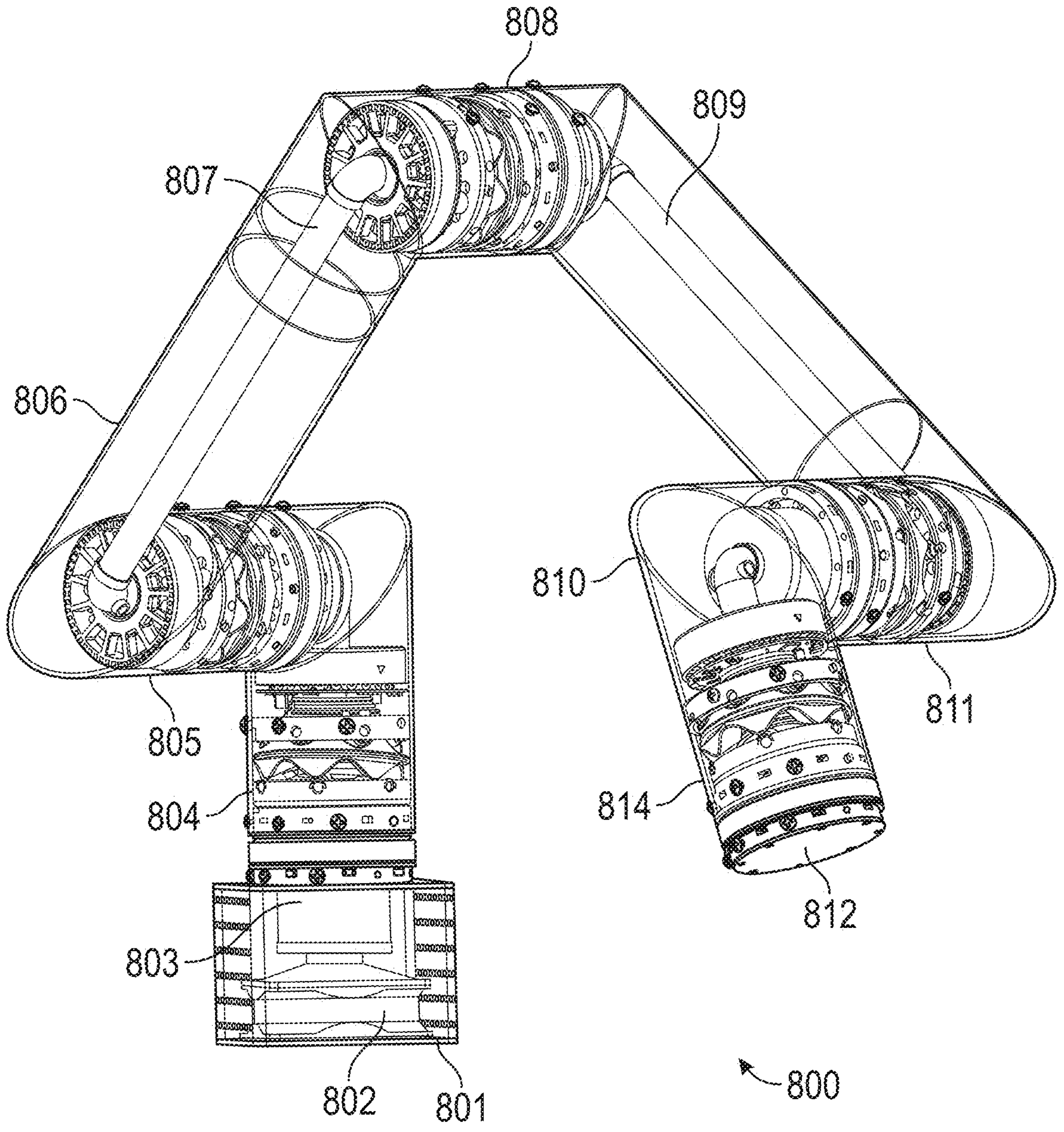
FIG. 8 is a front, partial see-through view of a five-axis robot arm that includes five of the assemblies of FIG. 7.

FIG. 8 illustrates a five-axis robot arm 800 that includes five of the assemblies 700 of FIG. 7 integrated therein. The robot arm 800 includes a base enclosure 801 having a cooling fan 802 that directs airflow through a hollow center slip ring 803. The slip ring also serves as a means to route electrical power and signals through the shoulder horizontal joint 804 which can be seen to include an assembly 700. Likewise, the shoulder vertical joint 805 includes an assembly 700. Aluminum exterior tubes 806 rigidly connect the joints to each other. It should be understood that the exterior tubes may be made of other materials known in the art such as steel, plastic, or composite materials such as carbon fiber. Joints have an internal tubing 807 routed between their hollow centers. These internal tubes may be made of plastic, metal or composite materials as well. The tubes may be used to carry power and signal wires as well as provide a conduit for airflow from the cooling fan. These tubes continue through the elbow joint 808 on through an internal tube 809 in the forearm, through a first wrist joint 811, through the wrist joint bend 810 and on through the second wrist joint 814. The airflow through the central tube exits near the end effector plate 812, where it routes back along the perimeter of the second wrist joint through small air holes that exist in each component of the joint that would otherwise block airflow. In this way, the airflow routes back from near the end effector to the base of the robot, running through all the speed reducers, and across the stator windings of each motor, thereby cooling the entire robot arm and all its motors with only one base fan. The heated air exits through the base enclosure, far from any object the end effector might interact with. This prevents hot exhaust air from interfering with or moving the objects near the end effector.

Figure 9A:
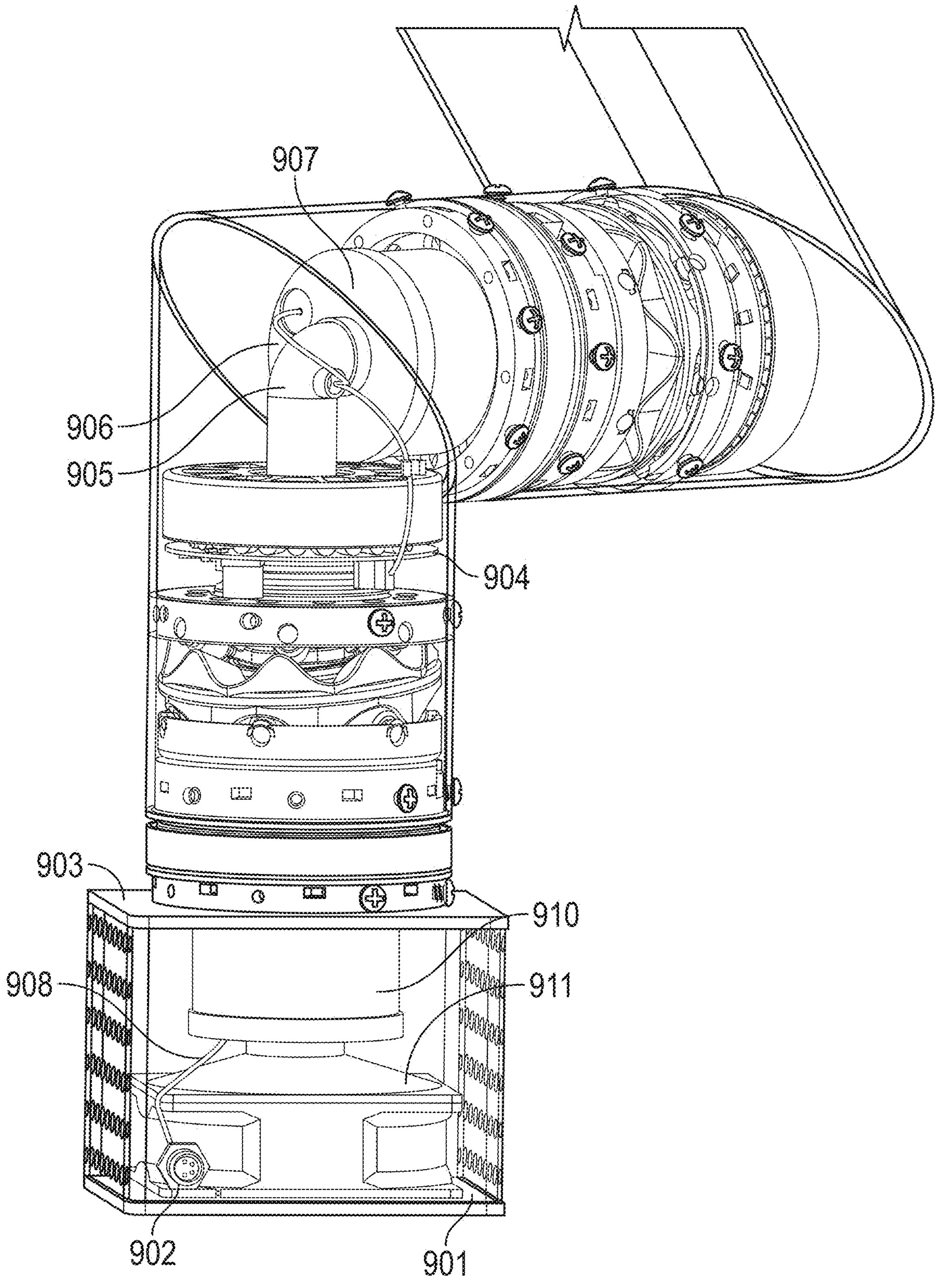
FIG. 9A is a front, top, side, partial see-through view of a portion of the five-axis robot arm of FIG. 8, illustrating example wiring and airflow elements for the five-axis robot arm.
Figure 9B:
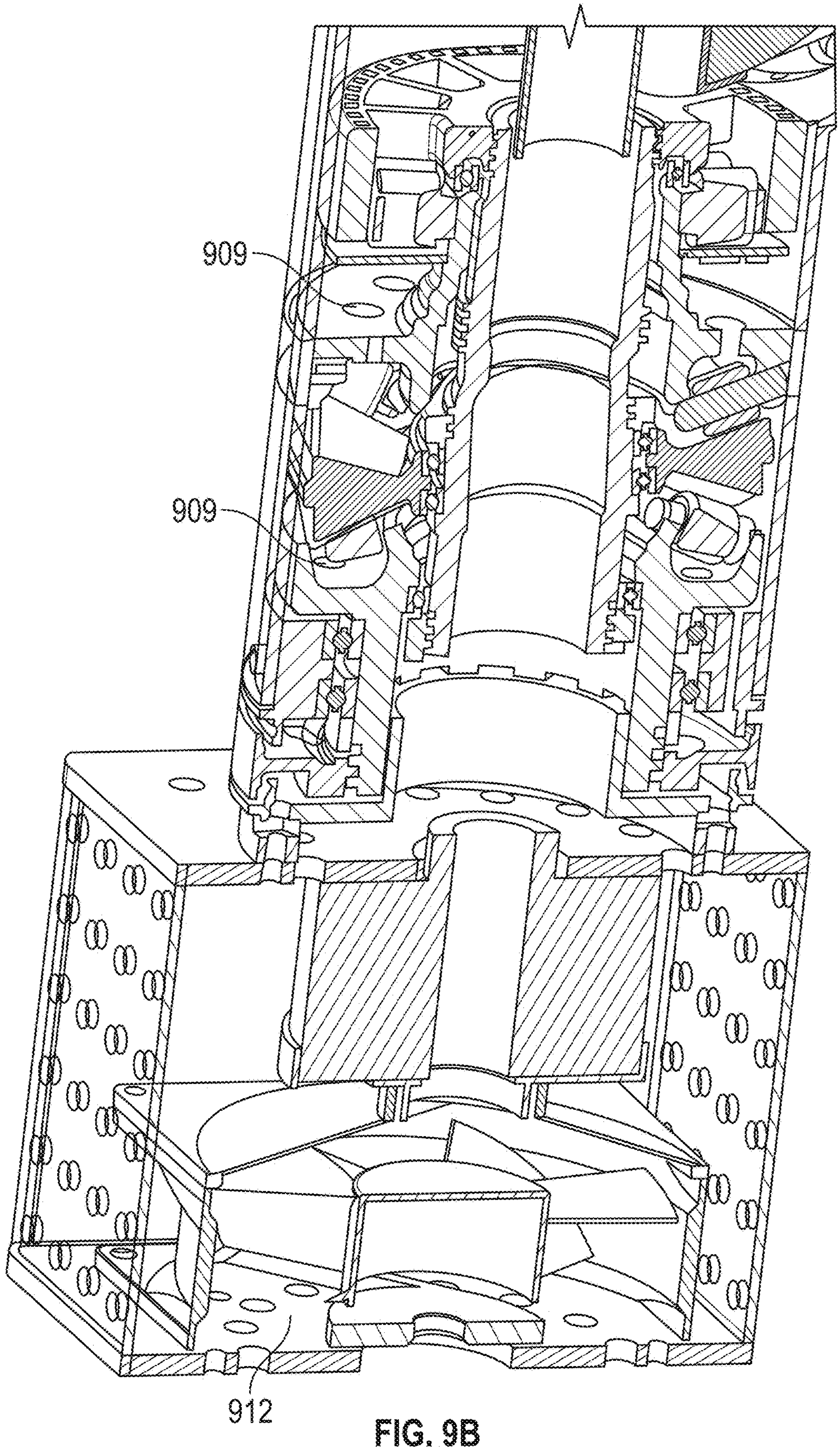
FIG. 9B is a front, top, side, partial see-through, cross-section view of a portion of the five axis robot arm of FIG. 8, illustrating example airflow elements for the five axis robot arm.

FIGS. 9A and 9B illustrate example wiring and airflow designs for the five axis robot arm. The base enclosure 901 is now presented in greater detail. An electrical connector 902 accepts an external electrical connection. In the preferred embodiment, four pin connectors are used, two pins for power, and two pins for signal. It can be seen that a wire bundle 908 runs from the connector to the slip ring 910. The slip ring center hollow also accepts airflow from the fan via a manifold 911. The fan air intake 912 is at the bottom of the base. The robot shoulder base plate 903 includes vent holes that vent airflow from the robot arm into the base enclosure. The airflow leaves the base enclosure through vent holes in the base enclosure. The wiring runs through the vertical robot joint and exits the airflow elbow 905 where it routes both to the motor PCB board 904 and to the next slip ring connector 906 that is part of the slip ring and joint assembly 907 further up the robot. The fan thus drives airflow through the center of the robot, through the slip ring hollows, through the joint centers, and through connecting tubes on the robot interior. The airflow then routes back from the distal end of the robot arm and out the base of the robot, running through a plurality of holes 909 near the perimeter of each of the robot joints and cooling the motor stators of each joint (as well as the power electronics and cams) along the way. This design provides a low-cost way to drive the motors at higher power levels than would be possible without active cooling, and requires only a single axial fan. It should be understood that air pumps or other gas moving techniques such as centrifugal fans, positive displacement pumps, rotary compressors, reciprocating pumps, or scroll compressors may also be used. While the present design uses atmospheric air, it should be understood that closed systems involving other gases such as carbon dioxide, isobutane, difluoromethane, or other refrigerants known in the art may also be used. It should also be understood that the working fluid (gas) may be pressurized when flowing through the robot arm, and heat may be wicked away by compressing the working fluid after it leaves the robot arm, as would be understood by a person of ordinary skill in the art of refrigeration.

Figure 10:
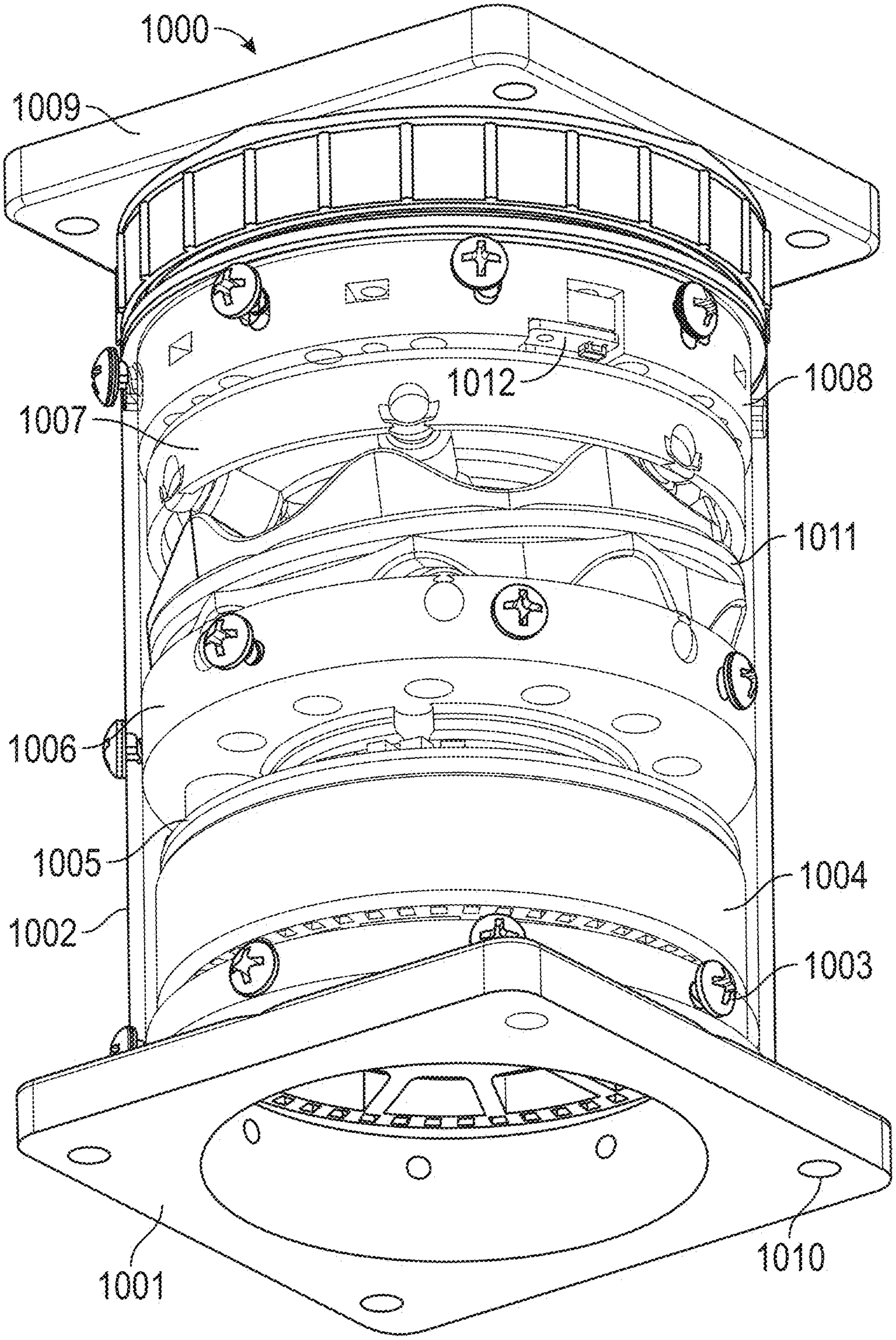
FIG. 10 is a front, side, bottom, partial see-through view of an implementation of a nutating cam shaft speed reducer.

FIG. 10 illustrates a nutating cam shaft speed reducer 1000 designed to integrate with t-slot framing. T-slot framing is widely used for rapid construction of manufacturing equipment. A smart speed reducer designed to integrate with t-slot framing allows manufacturers to quickly design and implement automation equipment. This is facilitated by the design's input side end plate 1001 that is secured using bolts 1003 to an aluminum exterior tube 1002 and has bolt holes 1010 that are designed for direct attachment to t-slot framing (which is commonly used in manufacturing automation equipment) by means known in the art. The speed reducer of FIG. 10 is adapted for use with "2080" t-slot framing, but it should be understood that the bolt pattern may be modified to accommodate other sizes. As in other embodiments, a rotor 1004 interacts magnetically with a stator (not visible). The stator wiring is powered by a PCB 1005. The PCB and stator both mechanically attach to an integrated motor tower 1006 that also serves as the input plate for the input side roller assembly. A nutating wobble cam 1011 interacts with the input plate and with output plate 1007 as before. The output plate is rigidly attached via an internal threaded assembly to an output side end plate 1009. The output side end plate also includes a bolt pattern that is designed to enable direct attachment to t-slot framing by means known in the art. An output bearing assembly 1008 allows the output plate and output side end plate to rotate with respect to the aluminum exterior tube and input side end plate. The absolute position of the output side relative to the input side may be determined after a homing sequence using a magnetic proximity sensor 1012 or other means, as would be understood by those skilled in the art. This design allows for motion control using t-slot framing.

Figure 11:
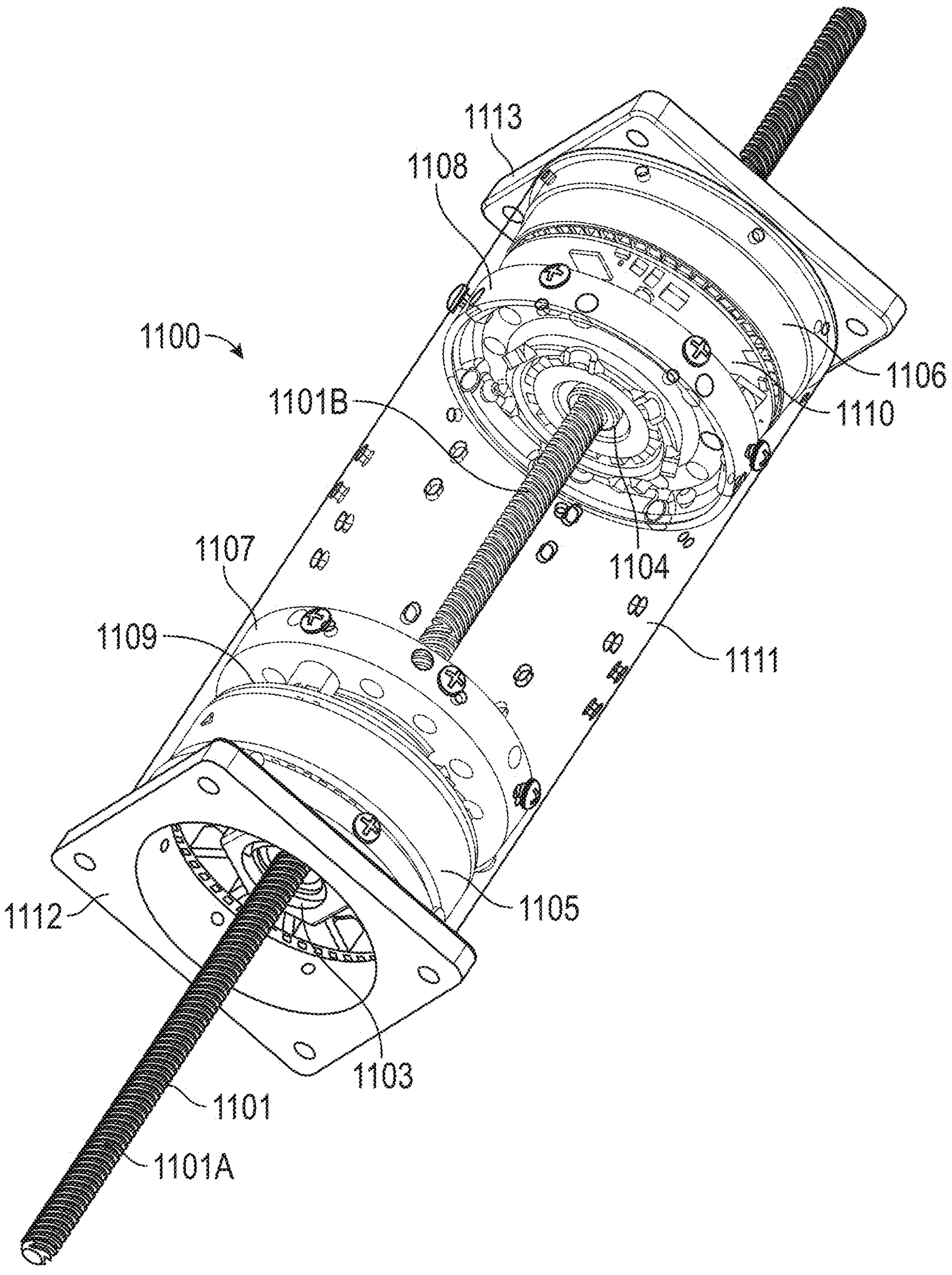
FIG. 11 illustrates a front, side, bottom, partial see-through view of a combined linear motion and rotational motion device.

FIG. 11 illustrates a combined linear motion and rotational motion device 1100. Using many of the same parts required for the t-slot framing motor, a combined linear motion and rotational motion robotic mechanism may be created. A bidirectional leadscrew 1101 has right-handed threads on a first half 1101A and left-handed threads on a second half 1101B. In the preferred embodiment, the leadscrew lead and pitch are identical on both halves, with only the helical direction reversed. The lead screw interfaces with a right-handed lead screw nut 1103 and a left-handed lead screw nut 1104. The leadscrew is free to slide within the leadscrew nuts along the helical path defined by the leadscrew threads. The leadscrew nuts are fixed to brushless direct-current (BLDC) motor rotors 1105, 1106, respectively. The rotors are fixed to motor towers 1107, 1108. The motor towers also retain or include or couple with control PCBs 1109, 1110. These control PCBs detect the magnetic field variations as the rotor rotates, and use that information to establish and control the rotor's position and speed. The motor towers also connect to an external tube 1111 via screws, adhesives, or other fastening techniques known in the art. The external tube has end caps 1112, 1113 at its ends which may be used to attach the tube to metal plates such as 2080 t-slots or other means of fixation.

By individually controlling the position of each motor, the leadscrew may be moved in various ways. If both motors simultaneously move clockwise or counterclockwise in lockstep, it should be understood that the leadscrew will also rotate clockwise or counterclockwise with the same angular rotation, and without any linear motion. On the other hand, if both motors move in opposite directions, but in equal amounts and in lockstep, the leadscrew will move linearly, without any rotation, and in proportion to the lead of the leadscrew. By establishing a desired linear motion and a desired rotational motion and summing the motor movements required to accomplish each, simultaneous rotation and linear motion may be accomplished. Advantageously, the two motors additively contribute torque to both pure linear motion and pure rotational motion of the leadscrew. In implementations this type of movement and torque summation is particularly valuable for the final joints of a Selective Compliance Assembly Robot Arm (SCARA).

Figure 12A:
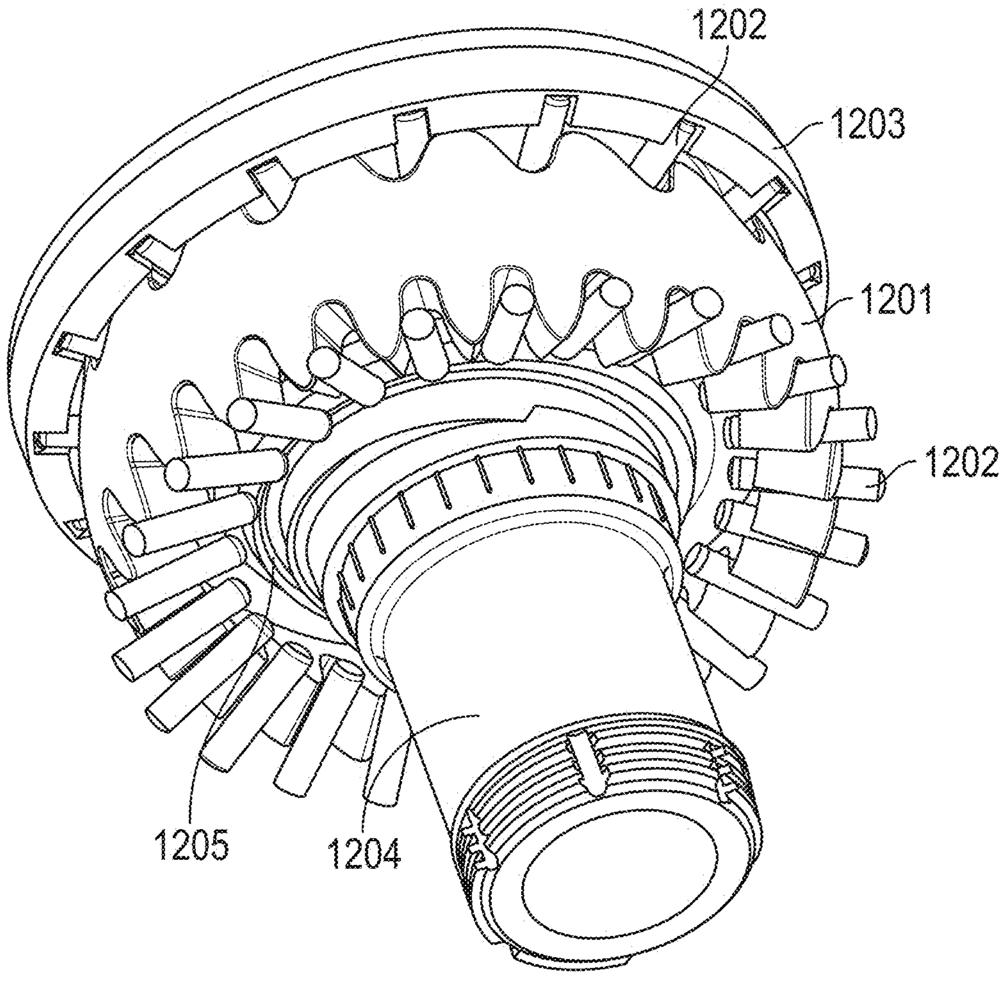
FIG. 12A is a front, side, bottom view of elements of the fixed-pin nutating cam shaft speed reducer of FIG. 12B.
Figure 12B:
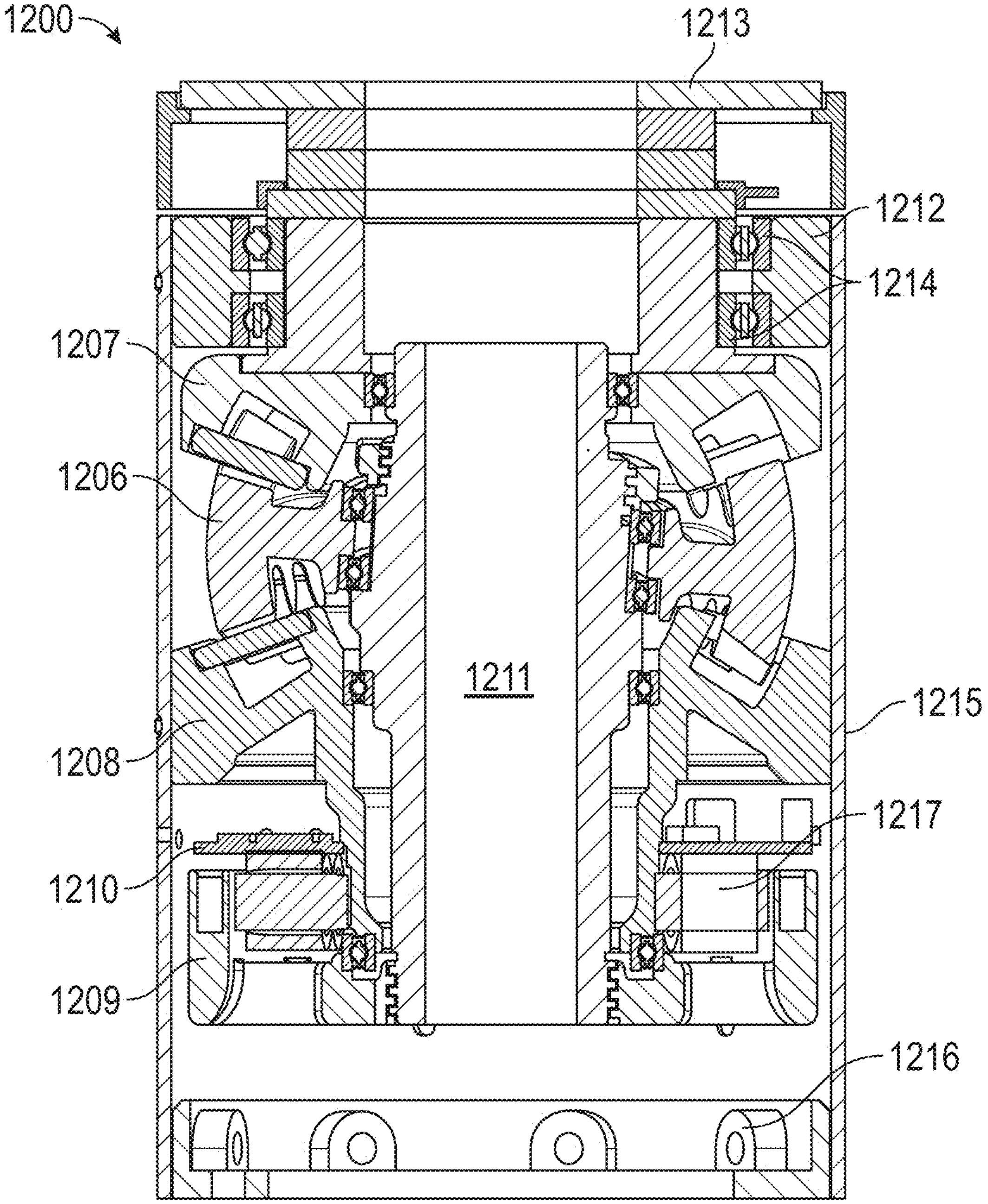
FIG. 12B is a front, cross-section view of an implementation of a fixed-pin nutating cam shaft speed reducer.

FIGS. 12A and 12B illustrate a fixed-pin nutating cam shaft speed reducer 1200. While rollers allow for reduced friction, in higher tooth count applications, fixed pins rather than rollers offer a higher density of pins in the same space and at lower cost and complexity, and with less audible noise.

A double-sided wobble cam 1201 is shown with twenty-five teeth on one face and seventeen teeth on the other face. The twenty-five tooth side of the wobble cam mates with twenty-four pins 1202 shown in a pin retainer 1203. The pin retainer has slots into which the pins insert using a snap-lock design known in the art. In alternative embodiments, the pins may be inserted from the side face, or may be glued or bonded in place using methods known in the art. A second set of sixteen pins 1202 interface with the wobble cam on its other face. The wobble cam and pin faces interface using the same design rules and mathematical principles that apply to the roller-based design. As in the roller-based design, a central axle 1204 drives an eccentric motion of the wobble cam through a bearing-based interface 1205.

In the cross-section view of FIG. 12B the wobble cam 1206 can be seen to assume a partially spherical shape. That shape nestles within the two sides of the output pin retainer 1207 and the input pin retainer 1208. This allows maximum rigidity and the best use of the available space. As in the roller-based design, an electric motor rotor 1209 may be used to drive the central axle 1211.

A stator 1217 magnetically motivates the rotor as in the default design. A PCB 1210 controls the magnet fields in the stator as in the default design. An output bearing retainer 1212 ensures the output shaft is rigidly rotatable relative to the exterior tube 1215. An output flange 1213 allows attachment to flat surfaces such as t-slot rails or other robotic or automation components. Two bearing assemblies 1214 ensure smooth rotation of the output. A fixed input side flange 1216 allows the reduction mechanism to attach to another flat surface such as t-slot rails or other robotic or automation components.

Figure 13A:
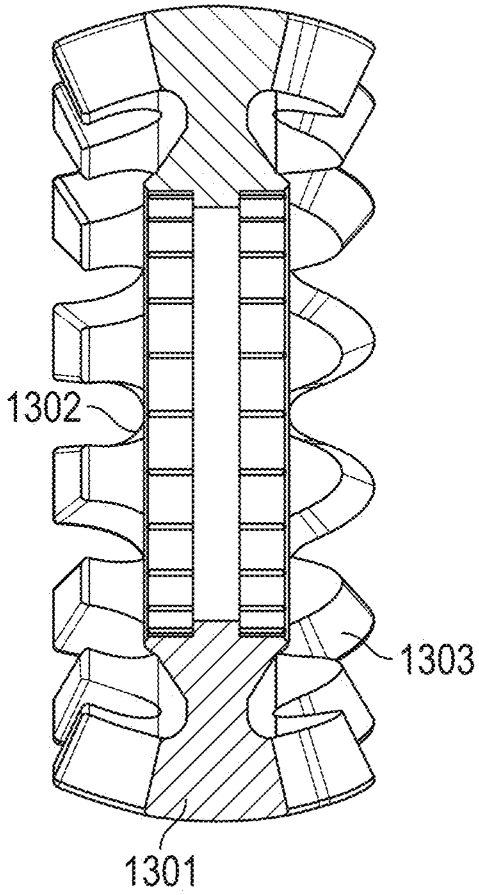
FIG. 13A is a front, cross-section view of an implementation of a nutating cam of a single-sided reduction fixed-pin nutating cam shaft speed reducer.
Figure 13B:
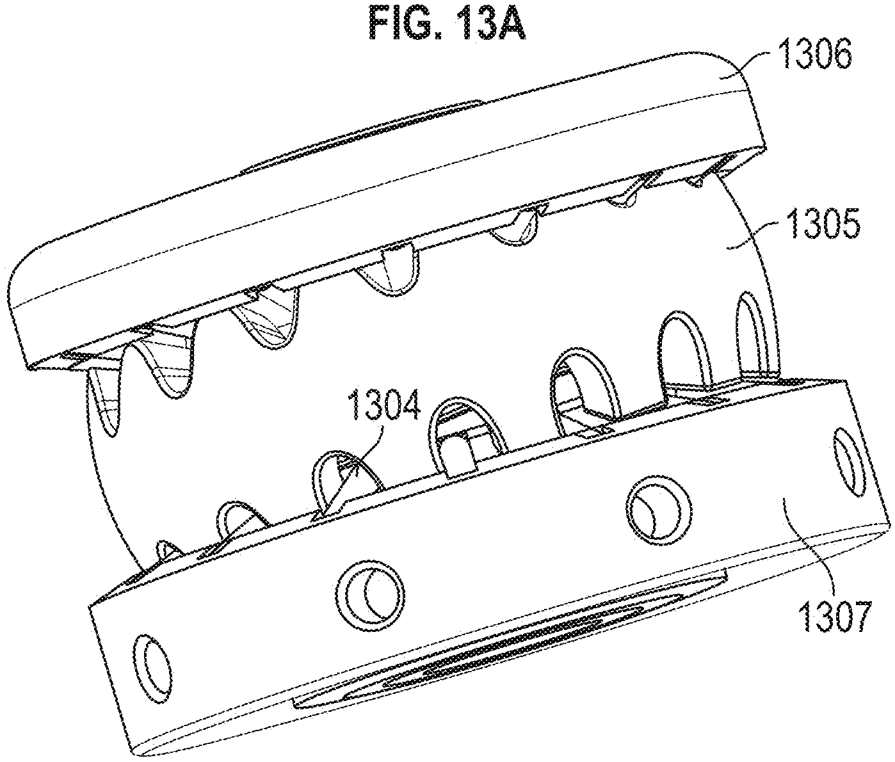
FIG. 13B is a front, bottom view of an implementation of a nutating cam and other components of a single-sided reduction fixed-pin nutating cam shaft speed reducer.
Figure 13C:
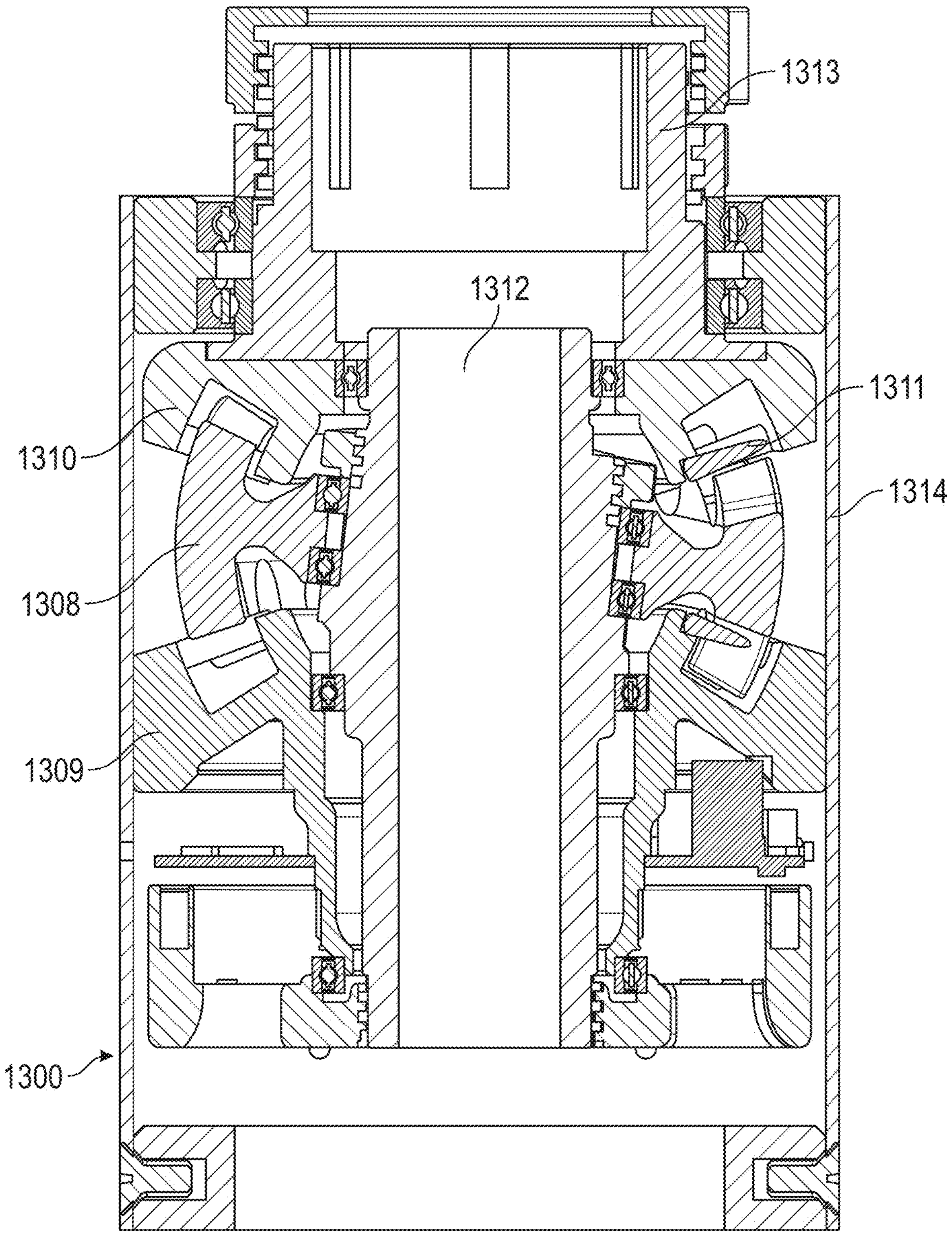
FIG. 13C is a front, cross-section view of a single-sided reduction fixed-pin nutating cam shaft speed reducer.

FIG. 13A is a front, cross-section view of an implementation of a nutating cam of a single-sided reduction fixed-pin nutating cam shaft speed reducer. FIG. 13B is a front, bottom view of an implementation of a nutating cam and other components of a single-sided reduction fixed-pin nutating cam shaft speed reducer. FIG. 13C is a front, cross-section view of a single-sided reduction fixed-pin nutating cam shaft speed reducer 1300.

Whereas the gear ratio of a two-faced design depends on the interaction of both faces using a formulaic relationship previously described, for lower reduction ratios, often only a single sided reducer is needed. In this case, the other face has a number of teeth equal to the number of pins. This results in nutation without rotation on that face. This embodiment also allows backdrivability, which is useful in certain applications.

It can be seen that above formula Win/Wout=1/(1−(N1/N2)*(N3/N4)) would reduce to Win/Wout=1/(1−(N1/N2)) when N3 and N4 are equal. For a design with N1=15, N2=16, N3=16, and N4=16, the gear reduction ratio would thus be 1/(1−(15/16)) or 16:1.

Wobble cam 1301 has such a configuration. The non-rotating face 1302 is composed of a series of conical oval cutouts. The other face 1303 of the wobble cam remains as before, here having sixteen teeth.

The mathematical underpinnings of the oval cutouts will now be described. HypLength is distance from the center of nutation to the plane of the oval cutout to be drawn. In other words, the ovals are drawn at an angle relative to the major diameter of rotation of the wobble gear, and if the major diameter radius is one leg of the triangle, the hypotenuse of that triangle is the orthogonal distance to the plane of the oval being drawn. That angle is the BevelAngle (twenty degrees in the preferred embodiment).

Consequently, given a known HypLength (36 mm in the preferred embodiment) the radius of the major diameter of rotation can be calculated using basic trigonometry as MajorDiameter=cos (BevelAngle)*HypLength.

Likewise, the other leg of the triangle is the length of the projection from the center of an oval to the plane of the major diameter. This is equal to OrthoProjection=tan (BevelAngle)*HypLength.

The conical oval cutouts (one for each pin and spaced equally about the cone) are centered and orthogonal to the line defined by rotation of the HypLength.

The major axis of each oval has a length of sin (NutationAngle)*HypLength, where NutationAngle is the angle of eccentricity of the wobble gear (seven degrees in the preferred embodiment).

The minor axis of each oval has a length of tan (NutationAngle)*OrthoProjection.

Thus, with knowledge of the location of the drawing plane of each oval, along with the major and minor diameters of the oval, a person of ordinary skill in the art of mechanical modeling could create a loft between the oval and the center of nutation. The face formed by this loft would then need to be moved (enlarged) by a distance equal the radius of the pin or roller that the fixed side gear face is meant to accommodate. Finally, this cutout would need to be patterned evenly about the diameter of the gear to create the desired number of mating faces.

In this way, the wobble cam 1305 mates with each pin 1304 on the non-rotating pin holder 1307, regardless of the angle of eccentricity of the wobble cam relative to the non-rotating pin holder. Owing to the ovoid cutouts, the wobble cam only nutates, but does not rotate, relative to the non-rotating pin holder. The other side of the wobble cam uses the same cam profile that has been previously described, and mates with the pins (or rollers, or conical rollers) of rotating pin holder 1306, similar to what is described for other implementations.

FIG. 13C shows that a nearly identical arrangement can be used with a single sided wobble cam (i.e., nutation without rotation on one side). As before, the wobble cam 1308 mates with a non-rotating pin holder 1309 and a rotating pin holder 1310. Pins 1311 are used on both pin holders—in fact the identical pin holder may be used for both the double sided and single-sided wobble cam designs. A central axle drives nutation of the wobble cam, and the output 1313 is free to rotate relative to the exterior tube 1314.

Figure 14A:
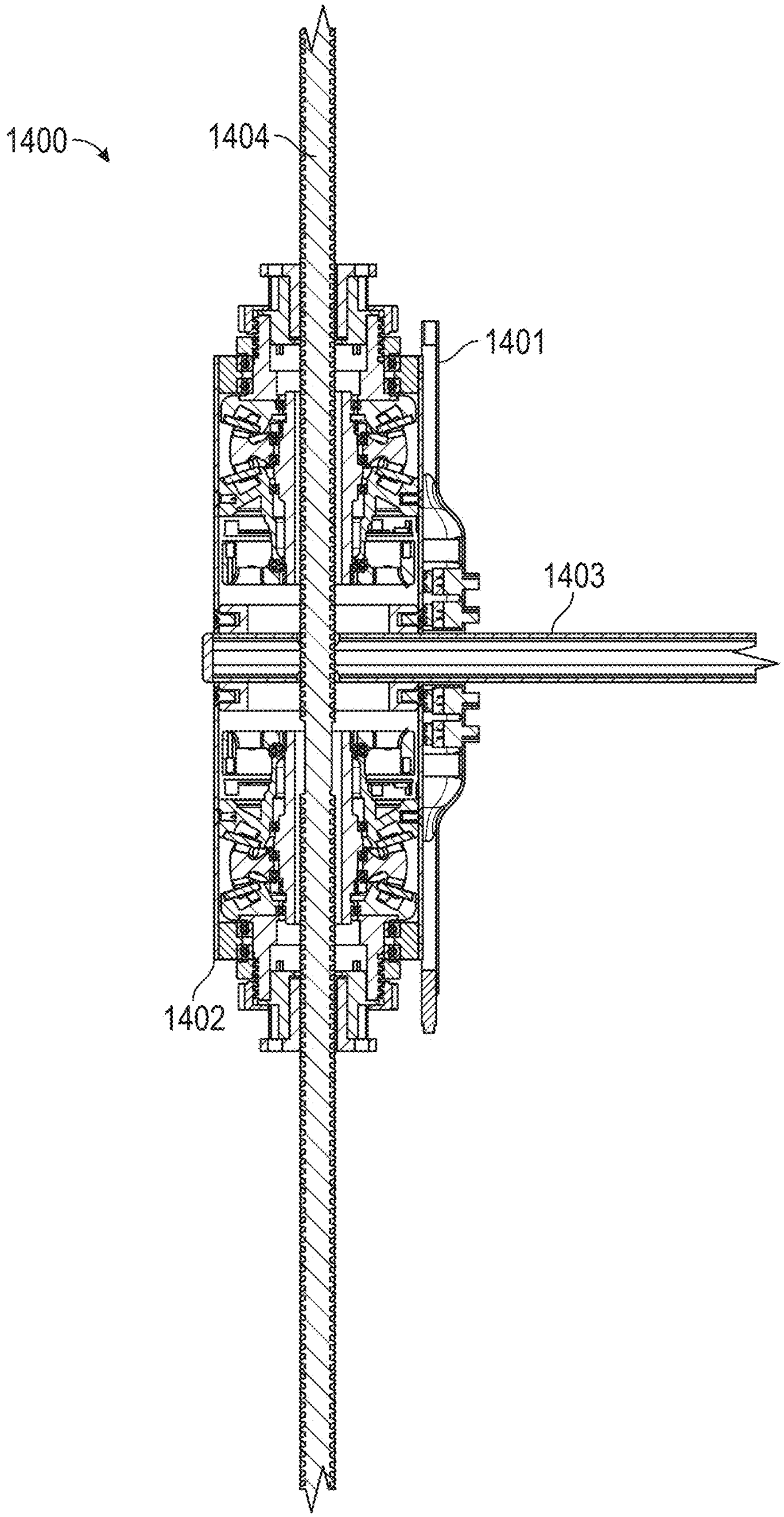
FIG. 14A shows a front, cross-section view of a linear motion and rotational motion device utilizing fixed-pin nutating cam shaft speed reducers.

FIG. 14A illustrates a combined linear motion and rotational motion device 1400 utilizing fixed-pin nutating cam shaft speed reducers.

Figure 14B:
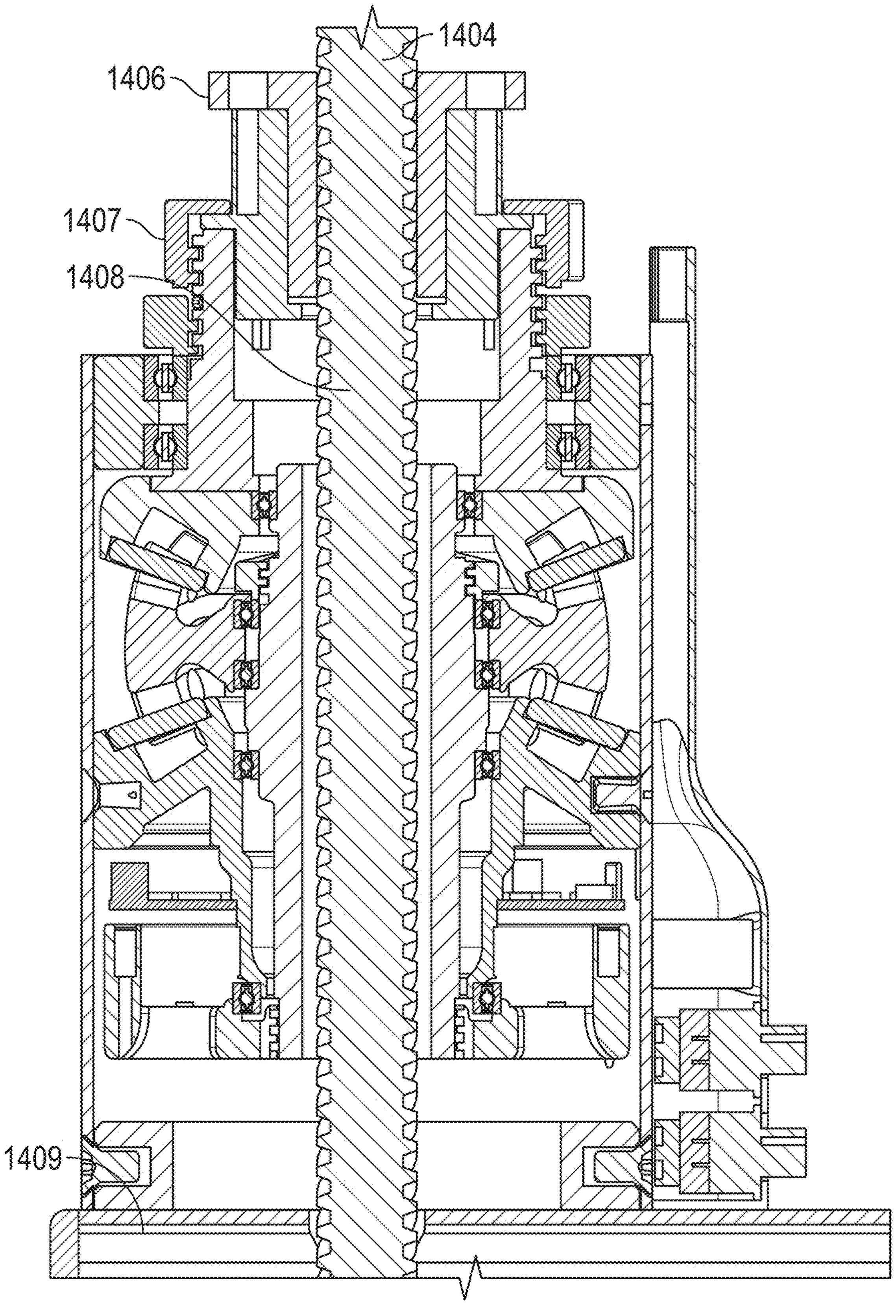
FIG. 14B shows a close-up, front, cross-section view of portions of the linear motion and rotational motion device of FIG. 14A.

FIG. 14A shows a front, cross-section view of a linear motion and rotational motion device 1400 utilizing fixed-pin nutating cam shaft speed reducers. FIG. 14B shows a close-up, front, cross-section view of portions of the linear motion and rotational motion device of FIG. 14A. The combination linear motion and rotational motion device is limited in maximum rotating torque by the torque of both motors driving rotation. This can be increased through the use of a reduction drive, and a reduction drive with a central hollow allows this to be done with a minimal exterior diameter. Consequently, the addition of the aforementioned gear reducer, particularly the single-sided variant—as the high reduction ratio afforded by the double-sided version is not needed in this application—is an improvement.

As in the prior version, a bidirectional leadscrew 1404 is held by an upper motorized section 1401 and a lower motorized section 1402. Both motorized sections are connected to a support mechanism. In the preferred embodiment, the support mechanism is an 8020 t-slot extrusion 1403. As t-slot extrusions are commodity parts and can be cut to any length, this allows the use of arbitrary link lengths when designing a robotic arm without significant re-engineering of the design.

As the upper and lower motorized sections are identical (other than the handedness of the leadscrew nut) it should be understood that focusing on either one is enough to understand both. The leadscrew 1404 interfaces with each motorized section through a leadscrew nut 1406 that matches the pitch of the leadscrew. The top and bottom halves of the leadscrew have differing pitch handedness (left-handed or right-handed) and the leadscrew nuts reflect this difference. Each leadscrew nut connects to the output of the reduction drive through a leadscrew adapter 1407. This allows varying the leadscrew diameter, pitch, and lead without modifying the remaining drive system. Each motorized section is otherwise the same as described previously for other versions. It should be understood that each motorized section would have a hollow 1408 sufficient to allow the leadscrew to pass through it. This is also the case for the t-slot support mechanism 1409, although other embodiments may involve a support mechanism that interfaces with the cylindrical exterior of a motorized section, rather than the side opposite the leadscrew nut.

Figure 15A:
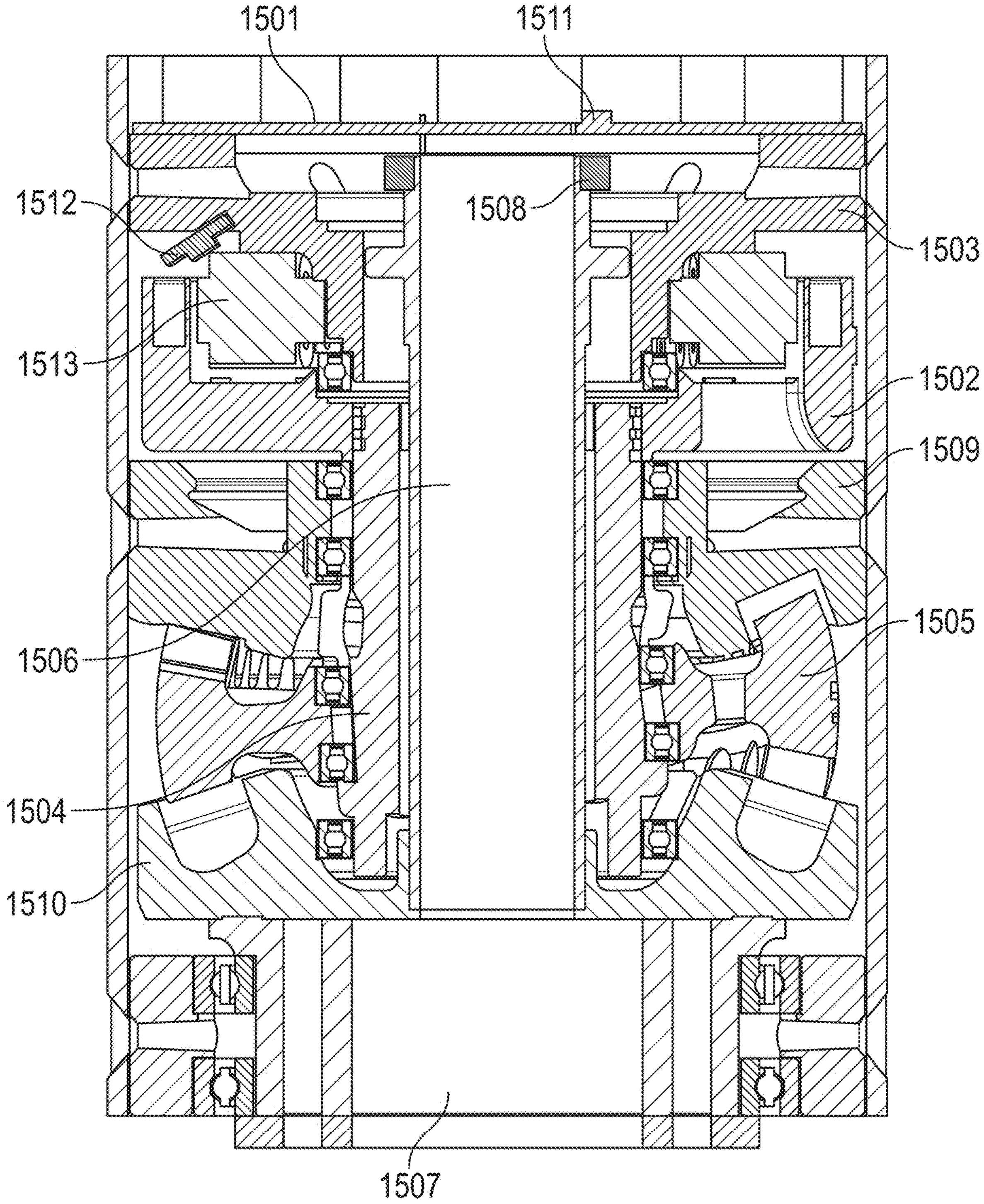
FIG. 15A is a front, cross-section view of an implementation of an inherently elastic actuator.
Figure 16:
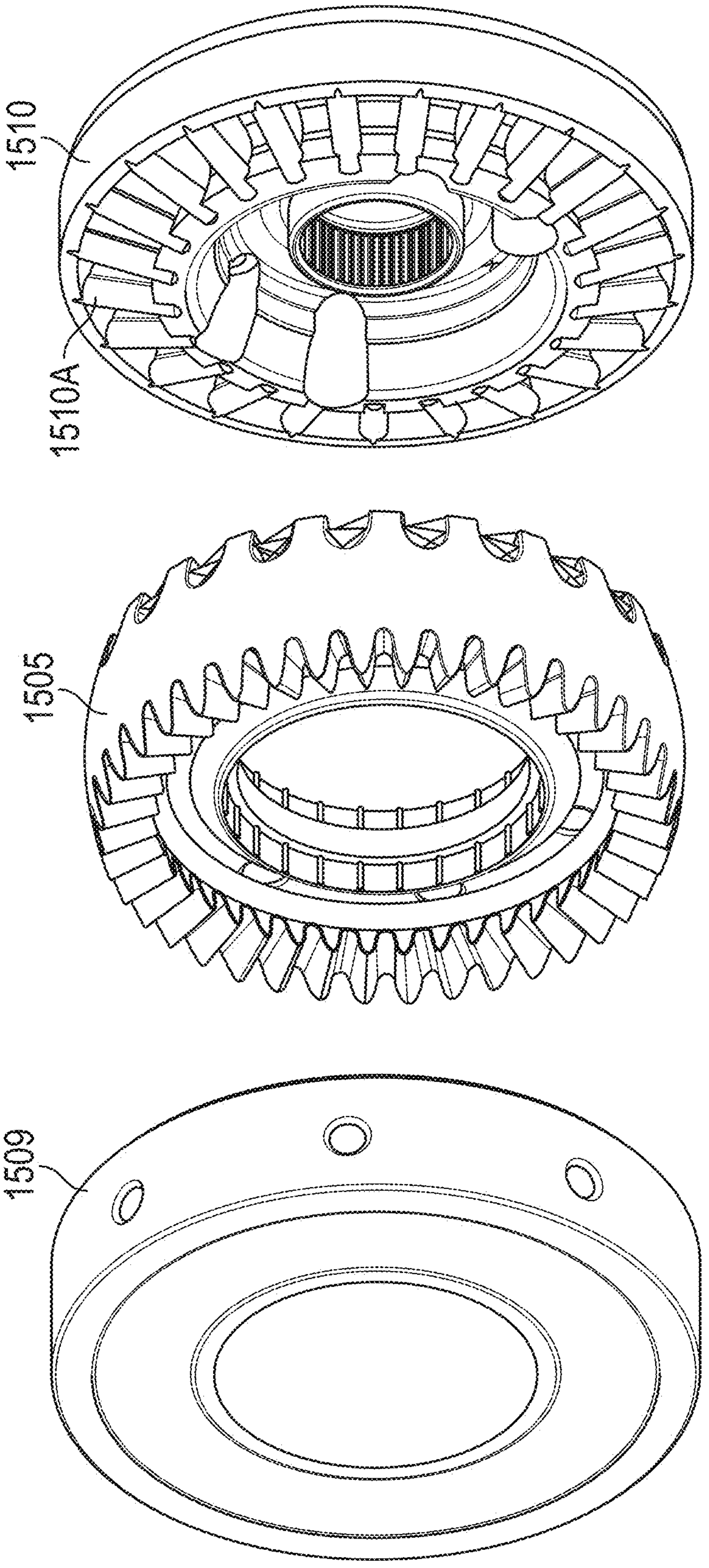
FIG. 16 is a top, front, perspective view of elements of the inherently elastic actuator of FIG. 15A.
Figure 17:
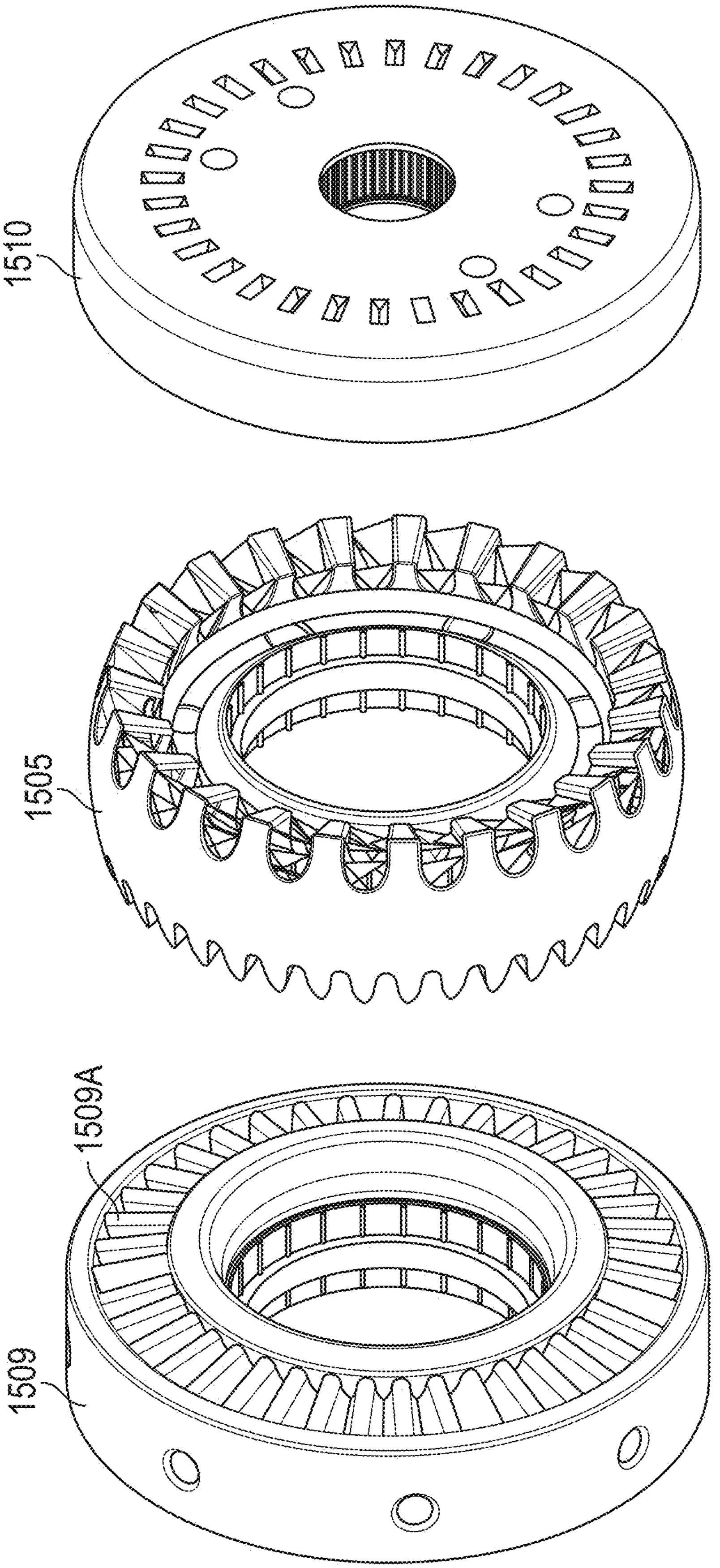
FIG. 17 is a bottom, front, perspective view of the elements of FIG. 16.

Referring now to FIGS. 15A and FIGS. 16-17, a front cross-section view of an inherently elastic actuator (in some ways similar to the reducer 1300 of FIG. 13C) is shown. The actuator of FIG. 15A is (or includes) a pericyclic nutating single-sided reduction fixed-pin shaft speed reducer. In this reducer implementation, the fixed pins 1509A and 1510A are composed/formed of plastic and fused/integrated with the non-rotating pin holder 1509 and rotating pin holder 1510, respectively. As such, each of the pin holders and its respective pins can be 3D printed or machined as a single part. Additionally, the location of the main PCB 1501 and the rotor 1502 have been swapped relative to reducer 1300. This enables access to the entire face of the PCB for placing connectors. It also results in a heat path from the stator windings 1513 to the exterior face of the actuator through the stator holder 1503. This provides improved thermal cooling when the stator holder 1503 is made of a thermally conductive material (such as, by non-limiting example, aluminum). Thermal potting compound (not shown) may be added between the stator holder 1503 and the stator windings 1513 to further improve thermal cooling. As with other implementations, the rotor 1502 mechanically connects to (or couples with) the axle 1504, which drives the wobble gear 1505 (which may also be called a wobble cam). The wobble gear is seen to have recesses on both sides which interface with the fixed pins 1509A and 1510A. A ring magnet carrier tube 1506 mechanically connects to (or couples with) the rotating pin holder 1510, which itself is connected to (or coupled with) the output shaft 1507. The other side of the magnet carrier tube 1506 mechanically connects to (or couples with) a diametrically magnetized ring magnet 1508. In some implementations this ring magnet is selected to be compatible with the requirements of a MONOLITHIC POWER SYSTEMS (MPS) MA600 magnetic encoder, although other high accuracy positional encoders known in the art may also be used. It should be understood that the ring magnet's rotational orientation is the same as the output shaft's rotational orientation. Therefore, a rotational sensor or encoder 1511 (which may be an MPS MA600 encoder in some implementations) may be used to establish the angular position of the output shaft 1507. As in other implementations, a rotational sensor 1512 is also used to establish the orientation of the rotor 1502. In FIG. 15A this sensor is located off of (or a distance from) the main PCB, and is electrically connected to the main PCB 1501 through a wire or cable (not shown). This allows more mounting options, including orienting the sensor such that it conforms more accurately to the plane of the magnetic field lines emanating from the rotor.

It should be understood that any torque applied between the rotor 1502 and the output shaft 1507 will result in stress between the rotor and the output shaft, and therefore some strain, because the plastic (or polymer) rotor, pin holders, wobble gear, and axle do not have infinite rigidity. As plastics/polymers are significantly less rigid than traditional gear materials such as brass or steel, this results in a measurable deflection—essentially a viscoelastic response—that increases as the torque increases. As the reducer of FIG. 15A has positional sensors that measure the angular position of the rotor and the output shaft, the system is able to sense torque as a deflection within the rotor, axle, wobble gear, and pin holders themselves. This is one of the benefits of the inherently elastic actuator concept.

The inherently elastic actuator may be controlled using algorithms suitable for series elastic actuators, except, of course, that the spring element is inherent to the gearing. While the nutating cam reducer of FIG. 15A exhibits the suitable elasticity necessary for implementing this control scheme, it should be understood that the control scheme may also be used with other reducers—such as strain wave gears and spring loaded pin cycloidal reducers, which also enable stress-strain curve deflection to be measured between the input and output of the reducer. One factor facilitating such a control mechanism is that the reducer has some lack of rigidity (resulting in deflection) that follows a continuous stress-strain curve (sometimes referred to as lost motion) as opposed to only backlash, which tends to be an all-or-nothing phenomenon (essentially a step function). As with series elastic actuators, the greater the spring compliance, the more accurate the torque control, but the lower the system bandwidth.

A gear reducer with inherently lower rigidity will provide more accurate torque control while also enabling greater impedance transparency. The greater elasticity also supports greater shock loads without damage, both because elastic materials can bend more (i.e., elastic deformation) before permanently deforming (i.e., plastic deformation) and because the actuator can sense the initial shock load as an elastic deformation of the actuator and actively move in the direction that reduces load.

A wobble gear 1505 is positioned at the heart of the nutating gear reducer. This is a two-sided gear that accepts loads on both faces, but centered on 180-degree axially opposed teeth on each face. As such, the wobble gear experiences a slight deformation when under load, increasing system elasticity. To describe this further, at any given time/rotation only some teeth/recesses on each face (input face and output face) of the wobble gear contact their mating fixed pins. If one defines the center of the location where the wobble gear's teeth/recesses on the input face mesh with mating fixed pins as zero degrees, then the teeth/recesses on the opposite side of the input face (180 degrees away along the circumference of the gear, which is what is meant by "axially opposed") would not be in mesh—the wobble gear's teeth/recesses at that location would not be in contact with mating fixed pins. At the same time, however, the output face at this same 180-degree location as measured around the gear circumference would be in mesh with mating fixed pins, and the teeth/recesses of the output face at the zero degrees location would not be in mesh. Because the wobble gear is being held in place against the mating fixed pins on each side, but 180 degrees apart axially, the gear is able to undergo some torsion, which facilitates elastic deformation.

By contouring tooth profiles of the wobble gear so that fewer teeth are in direct contact when unloaded, and by changing the thickness and rigidity of the wobble gear, the spring force may be tailored to a particular application. For example, the spring force may be made more progressive and nonlinear with respect to displacement.

Figure 15B:
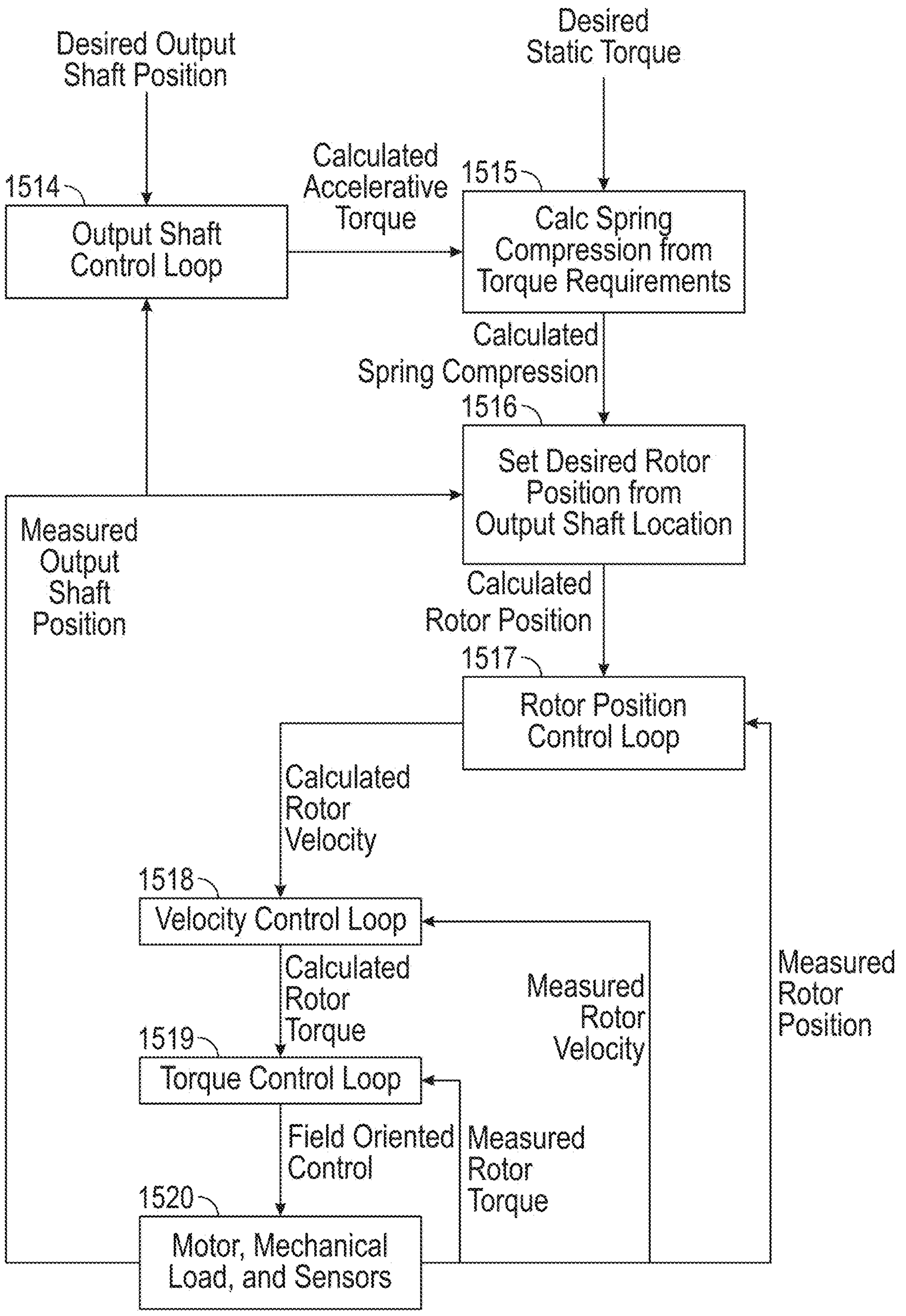
FIG. 15B is a box diagram representatively illustrating example methods of use related to the inherently elastic actuator of FIG. 15A.

FIG. 15B shows a block diagram representatively illustrating methods of use and/or control of the inherently elastic actuator of FIG. 15A. As with a series elastic actuator (SEA), the inherently elastic actuator uses a cascading series of control loops. Many SEA control algorithms are known in the art. Below is described a control algorithm/method consisting of three nested (cascading) control loops.

The inner loop 1519 manages torque control, using the well-known field oriented control (FOC) algorithm, described in more detail in U.S. Pat. Pub. No. 2025/0015654 A1, titled "Motors and Related Methods of Manufacture and Use," listing as first inventor Roy Sandberg, published Jan. 9, 2025, the full disclosure of which is hereby incorporated herein by reference. In implementations, this loop runs at 40 KHz.

An intermediate loop 1518 manages velocity control. In implementations a Kalman filter is used to smooth the output of the rotor's angular position sensor, thereby providing a de-noised and substantially continuous velocity signal. A proportional-integral (PI) or proportional-integral-derivative (PID) loop is then used to maintain constant velocity, as is known in the art of motion control. A desired torque is requested in accordance with the output signal of the PI or PID loop. In implementations this loop runs at 8 kHz. By running slower than the torque loop, the velocity control loop gives the torque loop time to react to changes.

The outer loop (1514 through 1517) manages position, both of the rotor and of the output shaft. This is done in a series of stages. This loop is responsible for correctly positioning the output shaft, based on both the desired position and the desired torque.

The output shaft control loop 1514 takes the desired output shaft position (angle) and the measured output shaft position (angle) and uses those two variables as inputs into a PID loop that outputs the calculated accelerative torque on the output shaft. The calculated accelerative torque as well as the desired static torque are both inputs into step 1515 which calculates spring compression from torque requirements. These two torque inputs are described in further detail below.

The inherent elasticity of the system results in a displacement d between the input and output of the reducer that is a function of torque t:

$$d=f(\tau)$$

This torque has two components: the static torque $\tau_s$ and the accelerative torque $\tau_a$.

The static torque is set by the end user, and is zero except in situations where the actuator presses against some load with a constant force or for actuator impedance control needs, as discussed below. For example, a user may wish to compensate for gravity by providing a compensatory force.

A perfect spring has a linear stress-strain relationship. While the true stress-strain relationship for a viscoelastic assembly (like a plastic/polymer gearing system) is far more complex, a linear approximation offers a starting point for analysis. The displacement of the system may be approximated using a spring constant k:

$$d=-(\tau_a+\tau_s)/k$$

A more complex relationship between stress and strain may also be modeled using a lookup table, allowing other mathematical relationships between stress and strain to be utilized in place of the constant k. This may be helpful in implementations, as the pericyclic nutating reducer has a distinctly non-linear relationship wherein its spring constant increases as the strain grows. More specifically, we have measured the stress-to-strain relationship as approximating a second order polynomial, wherein the measured stress force substantially correlates to the square of the applied strain. This advantageously prevents the system from "bottoming out," or hitting a spring limit that results in a sudden transition to a rigid coupling between the motor and the load. It also increases the dynamic range of the system, and results in an actuator that has more torque sensitivity at low torques than at high torques, but also wider force control bandwidth (responsiveness) at higher torques. As the spring constant grows sufficiently large, the system begins to act like a rigidly coupled system, and so the transition from elastic force control to rigid system occurs gradually, without any force discontinuity.

This non-linear spring force may be calibrated by directly commanding the actuator's motor to a particular torque (step 1519) while the output shaft of the actuator is locked in position. This will result in a displacement between the input position sensor and the output shaft sensor angles, and that displacement will correlate to the particular torque that was commanded. By commanding a series of increasing torques and associated displacements, a two-way mapping between torque and displacement can be interpolated for any non-linear spring.

In some implementations, it may be necessary to model backlash as well. This can be done by a calibration routine that looks at the total distance the input position sensor can be moved in the positive and negative directions before triggering discernible motion of the output position sensor. The middle of this range can be assumed to be the neutral position from which further calculations can begin.

The accelerative torque ($\tau_a$) is simply the output of the output shaft control loop's PID loop (step 1514). A more complete model of accelerative torque may be established with knowledge of the angular acceleration ($\alpha$) and moment of inertia (I) using the following formula, which is the rotational equivalent of F=ma:

$$\tau_a = I\alpha$$

For a motion-controlled system, the instantaneous angular acceleration is known because the system generates a motion profile with a given rate of acceleration for each instantaneous move segment. Alternatively, for interactive systems (such as teleoperated actuators with a driving and driven actuator) the acceleration can be derived as the derivative of velocity data from the driving actuator of the teleoperated pair. The moment of inertia can be estimated and/or calculated empirically using techniques known in the art. Thus, the necessary spring displacement to achieve the desired torque may be calculated as the basis of a feedforward term to improve system performance.

With knowledge of the spring displacement, the system calculates the rotor position (angle) from the output shaft location (step 1516). Just as the gear reducer itself results in a speed difference between the input and output, it also results in an angular movement difference. The input's (motor shaft's) angular movement is a multiple of the output—that multiple being the gear ratio. For example, if the actuator has a 40:1 gear ratio, the motor's angular displacement is forty times that of the output shaft. This knowledge allows one to normalize displacement between the input and output shafts. A given distance delta on the output shaft should be multiplied by the gear ratio before being compared to a rotor distance delta.

The rotor position control loop 1517 then closes a PID loop around the rotor position (angle) such that the error is the difference between the measured rotor position and the calculated rotor position from stage/step 1516. This error is used to establish the desired rotor velocity.

In implementations, this loop (1514 through 1517) runs at 1.6 kHz. By running the position loop slower than the velocity loop, the position control loop gives the velocity loop time to react to changes.

As described above, the physical system 1520 includes a motor with position (angle) sensors both at the rotor and at the output shaft. It should be understood that in implementations the output shaft is intended to drive a load with some intrinsic inertial moment.

Actuator impedance refers to how an actuator resists motion when a force is applied to the actuator or how the actuator responds to external disturbances—it captures the dynamic mechanical behavior of the loaded actuator, including inertia (resistance to acceleration), damping (resistance to velocity), and stiffness (resistance to displacement).

The actuator's ability to precisely control force grants some ability to modify these behaviors using additional control parameters, as indicated below.

Virtual Mass (inertia)—the actuator resists back driving motion in proportion to acceleration multiplied by a scaling factor $K_i$:

$$\tau_s = -(K_i) \times (\text{acceleration})$$

This cannot reduce the existing intrinsic inertia of the load, but can increase it.

Virtual Viscosity (damping)—the actuator resists back driving motion in proportion to velocity multiplied by a scaling factor $K_v$:

$$\tau_s = -(K_v) \times (\text{velocity})$$

Virtual Spring Constant (stiffness)—the actuator resists back driving motion in proportion to an offset from the set point multiplied by a scaling factor $K_s$:

$$\tau_s = -(K_s) \times (\text{offset})$$

In implementations the virtual spring constant is the most useful, as setting the spring constant to zero results in "follow mode"—the actuator simply moves to where it is pushed by keeping the actuator's force at zero. Likewise, setting the spring constant to the maximum results in "rigid mode"—the actuator resists any movement up to the limits of the position PID loop.

Each of these behaviors may be implemented by iteratively setting the desired static torque parameter $\tau_s$ in accordance with the above equations.

Other useful control parameters that may be implemented are detailed below.

Virtual Friction: The actuator resists back driving motion away from current position with some set torque ($\tau_s$), but sets the torque to zero when the back driving movement ceases.

Constant Force Offset: The actuator applies a constant torque in some direction. This requires a direct setting of $\tau_s$, as discussed above.

Safety Fencing: The actuator zeroes out torque ($\tau_s$) when a defined distance from the setpoint is exceeded.

Implementations of gear reduction systems based on the elements shown in FIGS. 15A-17 may include: an input shaft; a gear interface; an output shaft; an input shaft angle sensor, providing input shaft angle readings; and an output shaft angle sensor, providing output shaft angle readings; wherein a strain is measured by comparing a variation between an input shaft angle reading and an output shaft angle reading, said strain correlating to a torque reading, said torque reading used in a motion control feedback loop. In implementations the torque reading may include/involve strain measured across the gear interface.

In implementations strain may be measured using the two sensors, wherein the first sensor is measuring the position or angle of the rotor, and the second sensor is measuring the position or angle of the inner central tube that juts out of the rotating output gear. As the system is loaded and the various parts distort due to stress, the total strain is measured (i.e. total strain seen by the rotor, axle, stationary gear, wobble cam, and output gear). In implementations the inner central tube/axle doesn't see any strain, because it is only connected on one side.

Although there is some discussion herein of forming one or more components from PA12 (Nylon 12) plastic, other nylons (PA11 for example) would also work and, likewise, resin-based 3D-printed polymers designed for functional use have been found to work. For injection molded gears materials such as nylon, polyester, polyether ether ketone (PEEK), and polyacetal are commonly used, and could be used for components of the devices/systems disclosed herein. Any material suitable for gear manufacturing can be used for gears and related components of the devices/systems disclosed herein but, depending on the material's modulus of elasticity, it may be necessary to modify the shape/thickness of the wobble gear/cam to more easily accommodate torsional flexure in order to gain the benefits enabled through strain sensing. In implementations each component of any device/system disclosed herein that is disclosed as being formed of a polymer may have a modulus of elasticity (Young's modulus) at or below: 20 GPa, 10 GPa, 9 GPa, 8 GPa, 7 GPa, 6 GPa, 5 GPa, 4 GPa, 3 GPa, 2 GPa, and/or 1 GPa.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of shaft speed reducers and related methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget"), then the claim does not require a "first" (or so on) of that element.

Method steps disclosed anywhere herein, including in the claims, may be performed in any feasible/possible order. Recitation of method steps in any given order in the claims or elsewhere does not imply that the steps must be performed in that order—such claims and descriptions are intended to cover the steps performed in any order except any orders which are technically impossible or not feasible. However, in some implementations method steps may be performed in the order(s) in which the steps are presented herein, including any order(s) presented in the claims.

In implementations the roller bearings, or fixed pins as the case may be, form surfaces useful for interacting with the cam faces. Indeed the input side bearings or fixed pins could be said to form input surfaces or first surfaces, while the output side bearings or fixed pins could be said to form output surfaces or second surfaces.

What is claimed is:

1. A speed reducer system, comprising:

a plurality of first surfaces and second surfaces;

a wobble cam comprising a front face having multiple recesses interfacing with the first surfaces, the wobble cam also having a back face having multiple recesses interfacing with the second surfaces, wherein the wobble cam nutates during rotation;

a first axle coupled with the wobble cam and configured to rotate the wobble cam;

a first sensor configured to measure an angle or position of a first component of the speed reducer system; and a second sensor configured to measure an angle or position of a second component of the speed reducer system;

wherein the system is configured to:

calculate strain using the measurements of the first sensor and the second sensor, said calculated strain corresponding with a torque; and use the torque as an input for controlling the system.

2. The system of claim 1, wherein the calculated strain pertains to a strain of one or more of: the first axle; the wobble cam; a rotor of the speed reducer system; a stationary gear of the speed reducer system; and an output gear of the speed reducer system.

* * * * *